United States Patent [19]

Kamei

[11] Patent Number: 5,901,239
[45] Date of Patent: May 4, 1999

[54] SKIN PATTERN AND FINGERPRINT CLASSIFICATION SYSTEM

[75] Inventor: Toshio Kamei, Tokyo, Japan

[73] Assignee: NEC Corporation, Tokyo, Japan

[21] Appl. No.: 08/690,744

[22] Filed: Aug. 1, 1996

[30] Foreign Application Priority Data

Aug. 2, 1995 [JP] Japan .................................. 7-197711

[51] Int. Cl.$^6$ .................................................. G06K 9/00
[52] U.S. Cl. .......................................... 382/125; 382/124
[58] Field of Search .................................. 382/115, 124, 382/125, 156, 157, 203, 204, 260, 266, 286; 395/23; 356/71

[56] References Cited

U.S. PATENT DOCUMENTS

| 5,109,428 | 4/1992 | Igaki et al. | 382/125 |
| 5,337,369 | 8/1994 | Shibuya | 382/125 |
| 5,572,597 | 11/1996 | Chang et al. | 382/125 |
| 5,659,626 | 8/1997 | Ert et al. | 382/125 |

FOREIGN PATENT DOCUMENTS

| 0339527 | 11/1989 | European Pat. Off. . |
| 63-029888 | 2/1988 | Japan . |
| 5-108806 | 4/1993 | Japan . |

OTHER PUBLICATIONS

Hung, "Enhancement and Feature Purification of Fingerprint Images", Pattern Recognition, vol. 26, No. 11, (1993), pp. 1661–1671.

Moayer et al., "An Application of Stochastic Languages to Fingerprint Pattern Recognition", Pattern Recognition, vol. 8, No. 3, (1976), pp. 173–179.

Rao, "Feature Extraction for Fingerprint Classification", Pattern Recognition, vol. 8, pp. 181–192, 1976.

Itoh, et al, "An Algorithm for Classification of Fingerprints Based on the Core", IEICE, D–II, vol. J73–D–II, No. 10, pp. 1733–1741, Oct. 1990.

Kawagoe, et al, "Automatic Classification of Fingerprint Pattern", Computer Vision, vol. 18–2, May 1982, Information Processing Society of Japan.

Asai, et al, Automatic Fingerprint Identification by Minutia–Network Feature—Feature Extraction Processes—, IEICE, D–II, vol. J72–D–II, No. 5, pp. 724–732, May 1989.

"Spider User's Manual" published by Kyodo System Kaihatsu K.K., 1982.

Takagi, et al, "Image Analysis Handbook" published by Tokyo University Press, 1991.

Mizutani, et al, "Extraction of Contour Lines Using Neighboring Relationships Based on the Voroni–Line Graph", IEICE, D–II, No. 11, pp. 1499–1506, Nov. 1991.

*Primary Examiner*—Jose L. Couso
*Assistant Examiner*—Duy M. Dang
*Attorney, Agent, or Firm*—Foley & Lardner

[57] ABSTRACT

A skin pattern classification system extracts ridge line data and valley line data from image data of a skin pattern. Minutiae are extracted from the ridge line data and the valley line data. Subsequently, minutia correspondence information is obtained by detecting mutual correspondence among the minutiae from the ridge line data, valley line data and the minutiae. Skin patterns are obtained by finding and tracing characteristic lines referring to the minutia correspondence information, the ridge line data and the valley line data, and the characteristic lines and the minutia correspondence information serve to provide pattern classification.

12 Claims, 16 Drawing Sheets

FIG. 3A
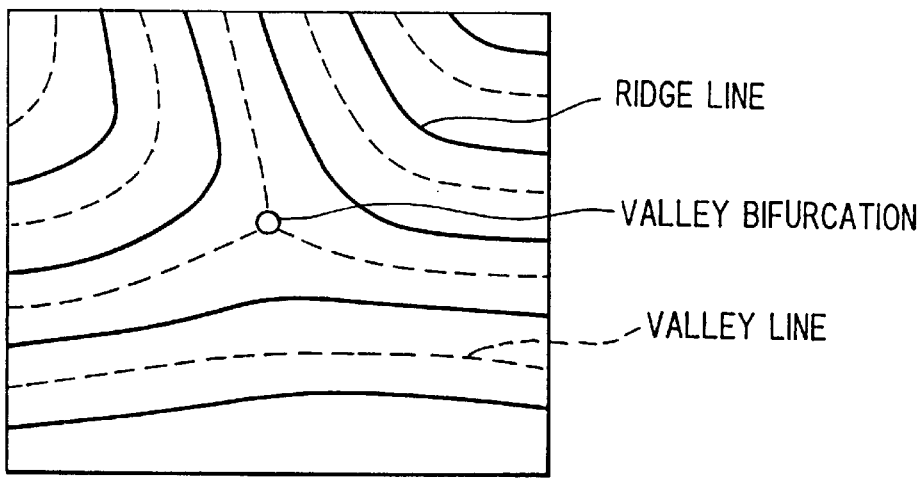
- RIDGE LINE
- VALLEY BIFURCATION
- VALLEY LINE
FIG. 3B
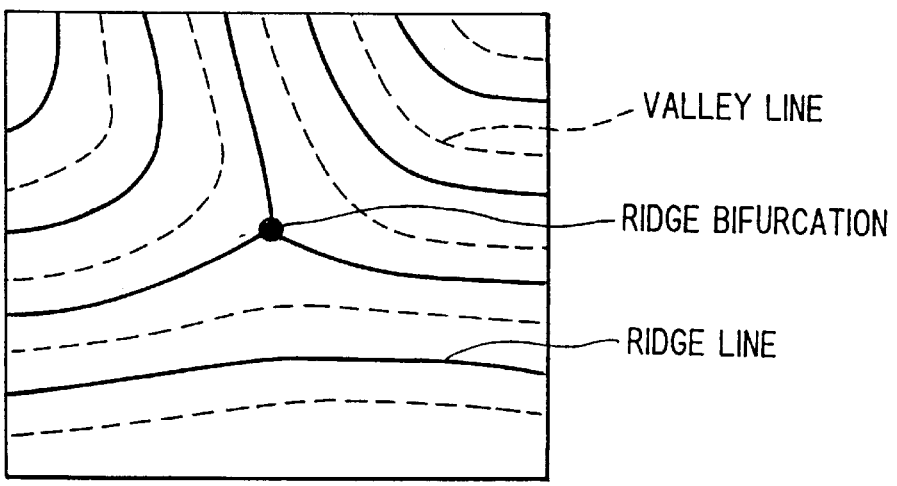
- VALLEY LINE
- RIDGE BIFURCATION
- RIDGE LINE
FIG. 4
| PLAIN ARCH | TENTED ARCH | RIGHT LOOP | LEFT LOOP | WHORL |
|---|---|---|---|---|
| α | β | γ | δ | ε |

CORE TYPE SINGULAR POINT

DELTA TYPE SINGULAR POINT

CORE TYPE SINGULAR POINT

DELTA TYPE SINGULAR POINT

| END POINT LIST | | BIFURCATION LIST |
|---|---|---|
| E1 | | B1 |
| E2 | ——— | B2 |
| E3 | ——— | B3 |
| E4 | ——— | B4 |
| E5 | ⨯ | B5 |
| E6 | ⨯ | B6 |
| E7 | ——— | B7 |
| E8 | | B8 |
| E9 | ——— | B9 |
| ⋮ | | ⋮ |
| En | | Bn |

FIG.22
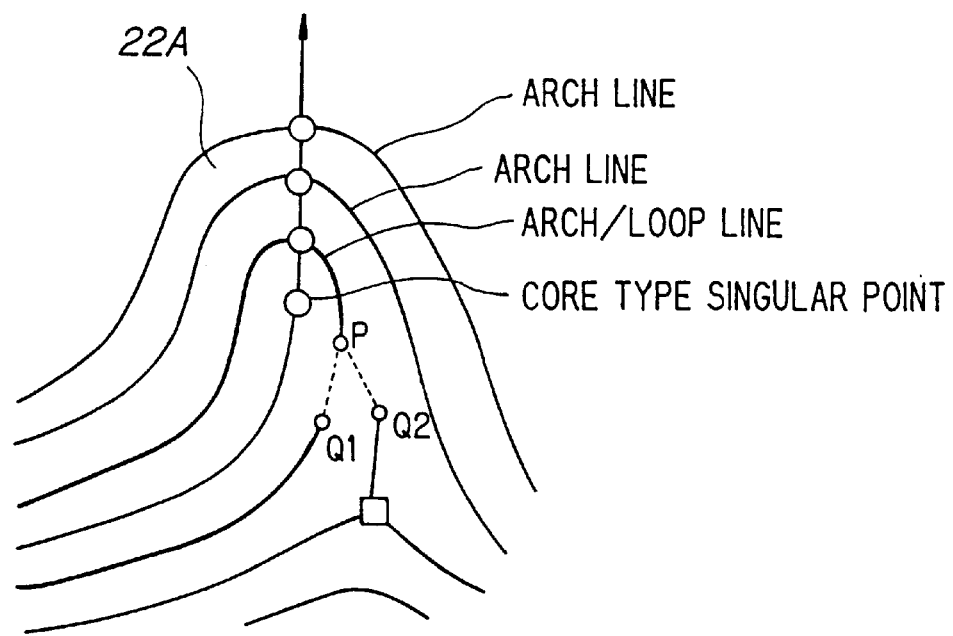
22A
- ARCH LINE
- ARCH LINE
- ARCH/LOOP LINE
- CORE TYPE SINGULAR POINT
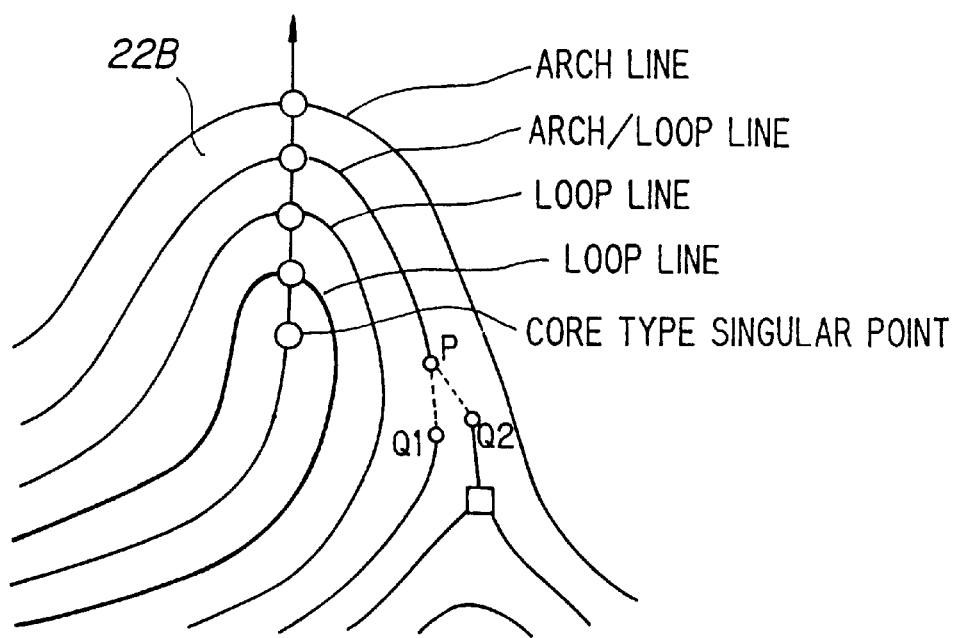
22B
- ARCH LINE
- ARCH/LOOP LINE
- LOOP LINE
- LOOP LINE
- CORE TYPE SINGULAR POINT

SKIN PATTERN AND FINGERPRINT CLASSIFICATION SYSTEM

BACKGROUND OF THE INVENTION

This invention relates to a skin pattern and fingerprint classification system for tracing and classifying features of skin patterns such as palm prints or fingerprints.

A method of fingerprint classification according to features extracted from thinned pattern lines obtained from fingerprint pictures is disclosed in a paper entitled "An Algorithm for Classification of Fingerprints Based on the Core" by Shinichiro Ito, et al., transactions of the Institute of Electronics, Information and Communication Engineers (IEICE), D-II, Vol. J73-D-II No. 10, pp. 1733–1741 (October 1990). Ito, et al., discloses a method wherein a core of a fingerprint is detected in a fingerprint image after thinning, then ridge lines around the core point are traced for obtaining features of the ridge lines. According to kinds (i.e., types) and distributions of the ridge line features, the fingerprint image can be classified, e.g., into one of four categories, Whorl, Arch, Right Loop or Left Loop.

In the prior art, a core is detected first, on an assumption that a scanning line passing on the core point should have a largest number of cross points with ridge lines. So, at a first step, cross points with ridge lines in an appropriate region of a fingerprint image, after thinning, are counted for each of a certain number of scanning lines drawn on the region. The scanning lines are drawn in a horizontal and a vertical direction and in directions rotated $\pi/4$ from them. At a second step, coordinates of a temporary core point are calculated from coordinates of the scanning lines having more than a certain number of cross points with ridge lines. At a third step, a region smaller than the region applied at the former steps is settled around the temporary core point thus calculated, and the first and the second steps are repeated concerning the smaller region. Thus, the core point of the fingerprint image is finally detected by repeating the first, the second and the third steps a certain number of times.

Then, in the prior art, a certain number of beginning points are considered on ridge lines around the core point thus detected. From each of the certain number of beginning points, each ridge line is traced in both directions. The tracing continues for a certain length along the ridge line for extracting feature data as coordinates of the beginning point and both ending points. The end points are determined by each of the directional tracings of the ridge line segments. By referring to the distribution of these feature data concerning the beginning points around the core, the fingerprint image is classified.

FIG. 23 is a schematic diagram illustrating the tracing of ridge lines around a core having features to be classified as a Whorl. First, a pair of beginning points are considered on a horizontal line passing through the core of the fingerprint. Then, each of a pair of ridge lines crossing with the horizontal line at the beginning points are traced in both directions for a predetermined length, and two pairs of ending points are obtained. When the distances between the ending points of the two pairs are both shorter than the distance between the beginning points, the core is defined to have a certain value of features to be classified into the Whorl.

Although a method of ridge line tracing is not specified in the above prior art, it is performed as follows. For example, when a gap is found on a ridge line, the following steps can be used.

For example, an end point is detected along a directional tracing of a ridge line, another ridge line is searched along a vertical line having the same x-coordinates as the detected end point. The ridge line trace is then continued on a ridge line found nearest from the detected end point. An example of this method of ridge line tracing is described in a paper entitled "Feature Extraction for Fingerprint Classification," by T. Ch. Malleswara Rao, Pattern Recognition, Vol. 8, pp. 181–192 (1976).

The prior art described above is based on the assumption that a scanning line on the core point has the largest number of cross points with ridge lines. However, because ridge line image is not always so clear, the scanning line having a largest number of cross points may not always pass through the core point. So, some errors may occur in the core point detection, resulting in a wrong classification of fingerprints. This classification error is a problem.

Also, in order to reject indefinite data to avoid a wrong classification that is caused by image degradation, methods of fingerprint classification based on ridge line tracing generally need complicated devices. These complicated devices have parameters that are difficult to control as to defining the rejection level and therefore is another problem. Further, when a second possibility of classification is desired to be assigned to a fingerprint image that is classified in a category with a low reliability, the assignment itself is hardly possible to be done in the prior art. In order to perform the assignment, the method is to instead use a human operator who knows the classification system very well.

Still further, as described above, there is indeterminacy in the method of ridge line tracing when, e.g., an end-point or a bifurcation of a ridge line is found in the ridge line tracing. Therefore, when a classification system based on ridge line tracing is applied for fingerprint classification, its analyzing performance is not sufficient, because it is easily affected by the curvature or the inclination of the fingerprint.

OBJECTS OF THE INVENTION

Therefore, a primary object of the invention is to provide a skin pattern and fingerprint classification system wherein skin patterns can be traced and classified with stable precision, where a rejection level of indefinite data is easily controlled, and where a second classification possibility can be assigned without difficulty, even when it is applied for fingerprint classification.

PRINCIPLE OF THE INVENTION

Skin patterns including fingertip patterns are generally composed of upheaved parts, i.e., ridges of the outer skin, and guttered parts, i.e., valleys, between the ridges. The ridges and the valleys of the outer skin form a striped pattern (i.e., stripes) which can be roughly classified into three groups.

FIG. 1A is a magnified image of an example of a striped pattern comprising a first group, wherein the ridges and valleys are arranged essentially in parallel. A ridge end and a valley bifurcation are comprised as shown in FIG. 1B. FIG. 1B illustrates a line image of FIG. 1A for expressing a line structure of the striped pattern. Examples of a second group are shown in FIG. 2A and FIG. 2B. FIGS. 2A and 2B each respectively illustrate a line image of essentially semi-circular stripes of ridges and valleys surrounding a valley end or a ridge end. FIG. 3A and FIG. 3B are also line images illustrating examples of the third group. FIGS. 3A and 3B respectively, are composed of delta stripes surrounding a valley bifurcation, or a ridge bifurcation.

Among the three groups, the semicircle stripe patterns of the second group can contain peculiar patterns called, in criminal laboratories, "Cores" of fingerprints. The third group can contain peculiar patterns called "Deltas" of fingerprints. The Cores and Deltas are regarded as important features for fingerprint classification.

In the present invention, singular points in these peculiar patterns are extracted for classifying fingerprints.

Now, an example of an extraction of the singular point is described.

End points or bifurcation points of ridges or valleys (hereafter generically called "minutia" usually are to be found coupled with other minutia in patterns of parallel stripes of the first group, as shown in FIG. 1B. That is, a valley bifurcation is found corresponding to a ridge end, while a ridge bifurcation is found corresponding to a valley end. Therefore, it can be said that there is a dual correspondence in each pair of minutiae in the parallel stripe pattern.

As for this dual correspondence, there are descriptions in a Japanese patent application entitled "An Apparatus for Extracting Fingerprint Features" and laid open as a Provisional Publication NO. 63-029888/'88, patent application entitled "An Apparatus for and a Method of Extracting Image Features" and laid open as a Provisional Publication No. 05-108806/'93, for example.

On the other hand, in the semicircular stripe patterns as shown in FIG. 2A or FIG. 2B, and in the delta stripe patterns as shown in FIG. 3A or FIG. 3B, where the directions of ridges or valleys vary sharply, any singular minutia has no corresponding minutia. Hereafter, such minutia having no corresponding minutia is called a singular point. A singular point found in a semicircular stripe pattern is called a core type singular point, and a singular point found in a delta stripe pattern is called a delta type singular point.

In the present invention, singular points, namely minutiae without a corresponding minutia, are detected at a first step by searching and omitting minutiae having dual correspondence.

Almost all of the singular points are found either in the Cores or the Deltas. Therefore, only by counting the number of singular points of a fingerprint, can the fingerprint be classified with a certain exactitude. In this example, the certain exactitude is when it is sufficient for the fingerprint to be classified into one of three categories of Arch, Loop and Whorl.

However, counting singular points, by itself, is not always sufficient. For example, both a "plain" Arch type and a "tented" Arch type of patterns (e.g., fingerprints) exist. In plain Arch type fingerprints, for example, the core type singular point is rarely found when the ridges and valleys of the fingerprints can be extracted exactly and the dual correspondence of the minutiae can be retrieved exactly. In tented Arch type fingerprints, however, the core type singular point is often found. In the Loop type fingerprint, only one core type singular point is found, whereas almost every Whorl type fingerprint has two core type singular points. Therefore, fingerprint classification can be performed only to some extent by counting the number of the singular points.

Concerning a method for detecting the singular point, there is a paper entitled "Automatic Classification of Fingerprint Pattern," by Kawagoe, et al., Computer Vision, Vol. 18-2, Information Processing Society of Japan, (May 1982). Kawagoe also discloses a simple method of fingerprint classification according to number of singular points, although through a different approach from the present invention.

However, with fingerprint classification based only on the singular point number, sufficient classification performance cannot be obtained, as is described in Kawagoe.

At a next step of the present invention, characteristic ridge lines or valley lines (hereafter called "characteristic lines") around the singular point are found and traced for extracting the features of the fingerprint. These features are used to discriminate a category into which the fingerprint is to be classified.

Suppose that fingerprints are to be classified into five types, for example, Plain Arch $\alpha$, Tented Arch $\beta$, Right Loop $\gamma$, Left Loop $\delta$ and Whorl $\epsilon$, as illustrated in FIG. 4. In this example, the number of core type singular points to be found in a fingerprint of each these five types, i.e., Plain Arch $\alpha$, Tented Arch $\beta$, Right Loop $\gamma$, Left Loop $\delta$ and Whorl $\epsilon$, are 0, 1, 1, 1, and 2, respectively.

The same number of delta type singular points are also to be found in the five types of fingerprints. However, the delta type singular points, are sometimes difficult to detect because fingerprints sufficiently wide for containing the delta type singular point are rarely gathered in actual cases. For these reasons, the present invention is described in connection with an example that makes use of the core type singular point.

Among fingerprints to be classified into the Loop type (i.e., the Right Loop and the Left Loop) and the Tented Arch, there are many fingerprints which are similar to each other and therefore difficult to be classified into either of these two categories. The difference between these two categories must be determined by detecting whether or not a loop line can be found. The reason for this determination is that the characteristic feature of the Tented Arch is that fingerprints of the type composed of arch lines have no loop line, while fingerprints of the Loop type comprise loop lines.

Referring to FIG. 5, here a loop line means a horseshoe shaped line, of which both ends of the line flow to the same side from the top of the horseshoe shape. The same side can be either to the right side in the Right Loop, or to the left side in the Left Loop. The same side flow of a line $a_l$ to $a_r$ or of a line $b_l$ to $b_r$ of FIG. 5 illustrates an example of a fingerprint of the Left Loop. On the other hand, an arch line means an arch shaped line of which each end flows to the opposite side, respectively of each other, from top of the arch shape. The opposite side flow of such a line $c_l$ to $c_r$ or a line $d_1$ to $d_r$ as illustrated in FIG. 5. When there is an imperfection such as a gap on a ridge line or a valley line, then generally the ends of the line should be traced, properly compensating the discontinuity of the line, for determining its line type.

In the Loop type, the core type singular point is surrounded by a horseshoe part of a loop line as shown in FIG. 5. The core type singular point is surrounded by a top part of an arch line in the fingerprints of the Tented Arch as shown in FIG. 6.

Therefore, it can be said that the difference between the Loop type and the Tented Arch type can be discriminated (i.e., determined) by detecting whether the nearest line surrounding the core type singular point is a loop line or an arch line.

As for fingerprints of the Whorl type having two core type singular points, line flow around the two core type singular points can be classified into two categories. FIG. 7A and FIG. 7B illustrates each example of the two categories of the Whorl type. In FIG. 7A, the two core type singular points are connected by either a ridge line or a valley line and are surrounded by a circular line. In the other category, as shown in FIG. 7B, two whorl lines are flowing out of the two core type singular points.

Therefore, by checking a characteristic line or characteristic lines connected to the core type singular points, fingerprints can be classified into Whorl types or other types, in spite of having two core type singular points. For example, a Loop type fingerprint having two core type singular points, as shown in FIG. 8 can be discriminated from a Whorl type, in order to prevent a wrong classification as a Whorl type.

SUMMARY OF THE INVENTION

In order to provide a skin pattern classification system based on the principle described above, a skin pattern classification system of the present invention is composed of a skin pattern tracing system and pattern classification device.

The skin pattern tracing system comprises:

an image data input device wherein image data of a skin pattern are input;

a ridge line extracting device for extracting ridge line data corresponding to ridges of said skin pattern from said image data;

a valley line extracting device for extracting valley line data corresponding to valleys off said skin pattern from said image data;

a ridge minutia extracting device for extracting ridge minutiae from said ridge line data;

a valley minutia extracting device for extracting valley minutiae from said valley line data;

a minutia correspondence extracting device for extracting minutia correspondence information by detecting dual correspondence among said ridge minutiae and said valley minutiae, from said ridge line data, said valley line data, said ridge minutiae and said valley minutiae; and a characteristic line tracing device for extracting features of characteristic lines of said skin pattern by finding and tracing said characteristic lines referring to said minutia correspondence information, said ridge line data and said valley line data.

And the pattern classification system of the invention comprises:

a device for pre-classifying said skin pattern into one of a plurality of detailed categories, said detailed categories defined according to said features of characteristic lines and said minutia correspondence information;

a probability table to be referred to with each of said detailed categories for obtaining classification probabilities, each of said classification probabilities corresponding to each of a plurality of output categories and indicating a probability of a skin pattern pre-classified into said each of said detailed categories that is to be classified into said each of said output categories; and a device for classifying a skin pattern pre-classified into each of said detailed categories into one of said output categories referring to said probability table.

Therefore, in the invention, by setting an appropriate threshold value of the probability, skin patterns can be traced and classified with stable precision, the rejection level of indefinite data is easily controlled, and a second classification possibility can be assigned without difficulty, even when it is applied for fingerprint classification.

BRIEF DESCRIPTION OF THE DRAWINGS

The further objects, features, and advantages of this invention will become apparent from a consideration of the following description, the appended claims, and the accompanying drawings in which the same numerals indicate the same or the corresponding parts.

FIG. 3A is a line image illustrating an example of a skin pattern composed of delta stripes surrounding a valley bifurcation.

FIG. 3B is a line image illustrating an example of a skin pattern composed of delta stripes surrounding a ridge bifurcation.

FIG. 4 illustrates examples of fingerprints to be classified into five categories, Plain Arch α, Tented Arch β, Right Loop γ, Left Loop δ and Whorl ε.

FIG. 15 is a schematic chart illustrating an example of the minutiae list with reference information of dual correspondence.

FIG. 22 illustrates patterns 22A and 22B, each of which is composed of a core line and surrounding lines and a ridge line segment P to Q1 or P to Q2 imperfect.

DETAILED DESCRIPTION OF THE PREFERRED EMBODIMENTS

Now, embodiments of the present invention will be described in connection with the drawings.

Figure 9:
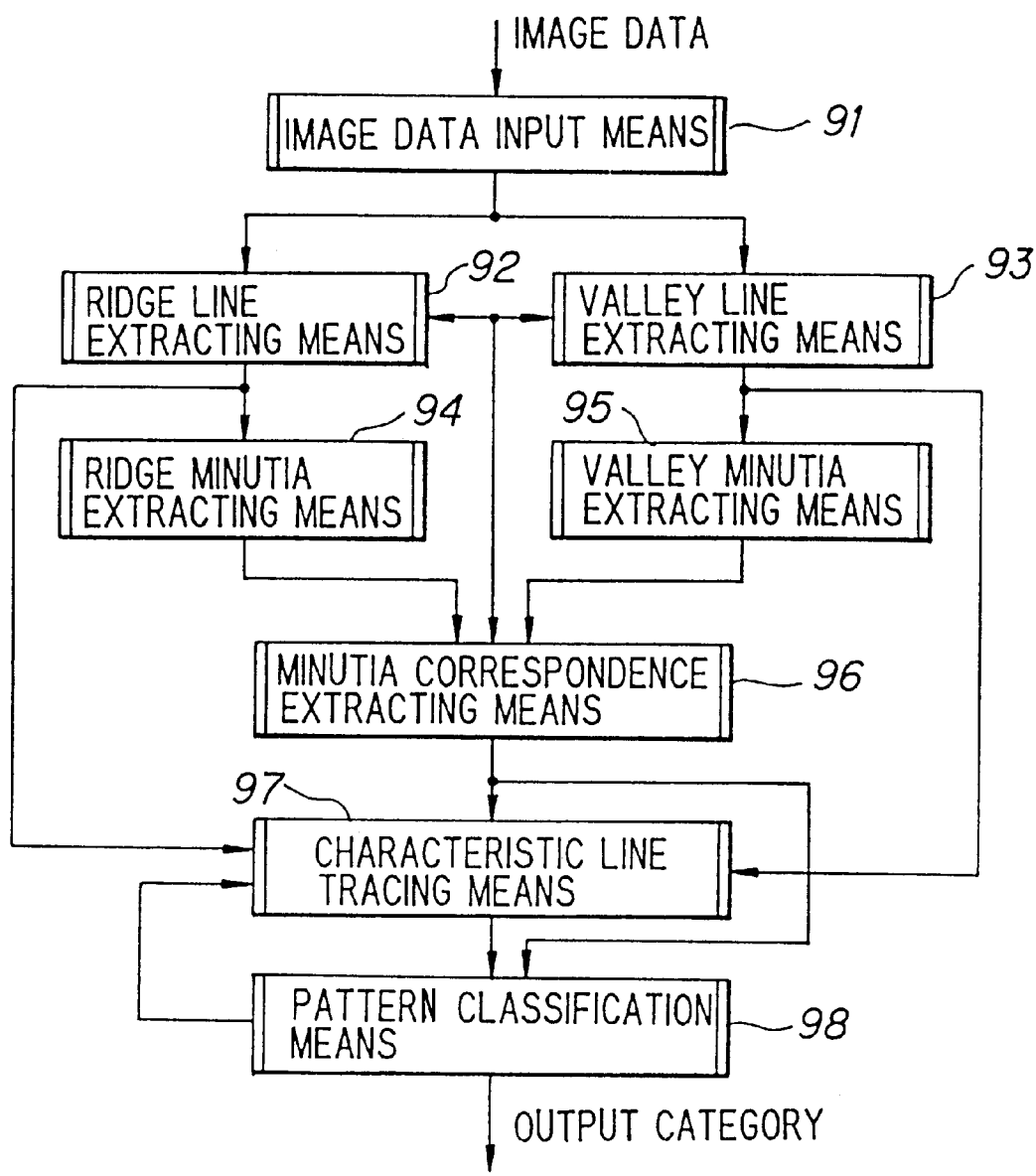
FIG. 9 is a block diagram illustrating a basic configuration of a skin pattern classification system of an embodiment of the invention.

FIG. 9 is a block diagram illustrating a basic configuration of a skin pattern classification system of an embodiment of the invention.

The skin pattern classification system of FIG. 9 is composed of a skin pattern tracing system and pattern classification device 98.

The skin pattern tracing system comprises;

an image data input device 91 wherein an image data of a skin pattern are input, a ridge line extracting device 92 for extracting ridge line data corresponding to ridges of the skin pattern from the image data, a valley line extracting device 93 for extracting valley line data corresponding to valleys of the skin pattern from the image data, a ridge minutia extracting device 94 for extracting ridge minutiae from the ridge line data, a valley minutia extracting device 95 for extracting valley minutiae from the valley line data, a minutia correspondence extracting device 96 for extracting minutiae correspondence information by detecting dual correspondence among the ridge minutiae and the valley minutiae, from the ridge line data, the valley line data, the ridge minutiae and the valley minutiae, and a characteristic line tracing device 97 for extracting features of characteristic lines of the skin pattern by finding and tracing the characteristic lines referring to the minutia correspondence information, the ridge line data and the valley line data.

The pattern classification device 98 classifies the skin pattern according to the features of the characteristic lines and the minutia correspondence information.

Figure 10:
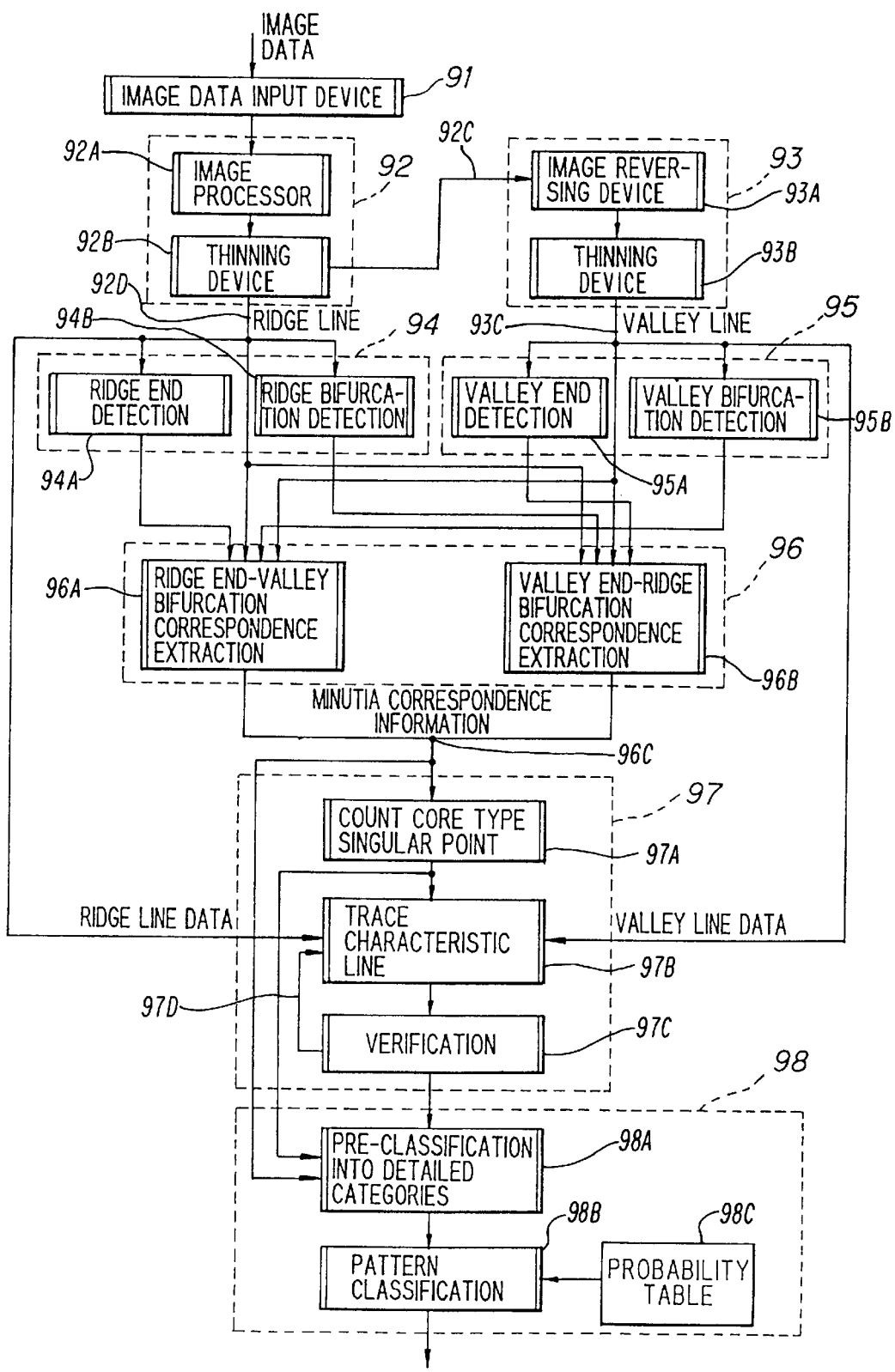
FIG. 10 is a more detailed block diagram illustrating the embodiment of FIG. 9.

FIG. 10 is a more detailed block diagram illustrating and including the embodiment example of FIG. 9. The following description is in reference to FIG. 10.

The ridge line extracting device 92 is provided with an image processor 92A for obtaining binary image data from the image data that is input through the image data input device 91 and a thinning device 92B for extracting the ridge line data from the binary image data. The valley line extracting device 93 is provided with an image reversing device 93A for obtaining reversed image data of the ridge line data and a thinning device 93B for extracting the valley line data from the reversed image data of the ridge line data.

The ridge minutia extracting device 94 has functions for detecting and listing up ridge ends 94A and ridge bifurcations 94B, while the valley minutia extracting device 95 has functions for detecting and listing up valley ends 95A and valley bifurcations 95B. The minutia correspondence extracting device 96 has functions for searching for the dual correspondence of the ridge ends to the valley bifurcations 96A, and for the dual correspondence of the valley ends to the ridge bifurcations 96B, each referring to the ridge line data and the valley line data. The minutia correspondence extracting device 96 also has functions for outputting the minutia correspondence information 96C for each of the minutiae, that is, information concerning each of the minutia if that minutia has a corresponding minutia, or the minutia having a state of solitude if the minutia has no correspondence.

The characteristic line tracing device 97 has a function for counting up the number of core type singular points 97A based on the minutia correspondence information 96C, a function finding and tracing characteristic lines 97B around the core type singular points according to the number of core type singular points, referring to the ridge line data and the valley line data, and a function for verifying features 97C extracted from the characteristic lines, including a feedback function 97D for repeating the function for finding and tracing characteristic lines 97B according to the verification result.

The pattern classification device 98 is equipped with functions for pre-classifying the skin pattern into detailed categories 98A according to the minutia correspondence information delivered from the minutia correspondence extracting device 96, the number of core type singular points counted by the characteristic line tracing device 97 and the features of the characteristic lines verified there, and classifying the skin pattern 98B into one of the output categories referring to a probability table 98C indicating each probability to be classified into each of the output categories of skin patterns that are pre-classified into each of the detailed categories.

Heretofore, configuration of an embodiment of the invention for skin pattern classification is described in connection with FIG. 9 and FIG. 10. However it should be noted that an embodiment for fingerprint classification can be provided with the same configuration. In the case of fingerprints, image data of a fingerprint are input instead of the skin pattern to the image data input 91, from which ridge line data and valley line data corresponding to ridges and valleys of the finger tip pattern are extracted by the ridge line extracting device 92 and the valley line extracting device 93. Features of characteristic lines of the fingerprint are extracted in the characteristic line tracing device 97, and the fingerprint is classified into the output categories at the pattern classification device 98 after they are pre-classified into the detailed categories.

As for the image input device 91, any conventional means appropriate for obtaining image data of a skin pattern or a fingerprint, e.g., such as an image scanner or a CCD camera, can be applied. Or the image input device 91 may be, e.g., a terminal for receiving telecommunicated image data.

Here, the embodiment will be described by way of example of an image data comprising a resolution of 500 dots per inch ("DPI").

Also, as for the ridge line extracting device 92, conventional devices can be applied. For obtaining binary image data from the input data, there can be applied such a device, for example, as disclosed in a paper entitled "Automated Fingerprint Identification by Minutia-Network Feature—Feature Extraction Processes—," by Asai et al., D-II of the IEICE, Vol. J72-D-II, No. 5, pp. 724–732, (May 1989). For thinning the binary image data into ridge line data, there can be applied, for example, a thinning algorithm introduced as Tamura's thinning algorithm in a document entitled "SPIDER USER'S MANUAL," published by Kyodo System Kaihatsu K.K., (1982). In the Tamura thinning algorithm, the thinning can be performed either by retaining 4-connectivity or by retaining 8-connectivity. In the embodiment, the thinning is described to be performed by retaining the 8-connectivity along Tamura's thinning algorithm.

As for the valley line extracting device 93, the valley line data are obtained by again thinning the reversed binary image data obtained by reversing the thinned ridge line data 92C, in FIG. 10. Here, as the ridge line data are retaining the 8-connectivity, the reversed data are first thinned several times, retaining the 4-connectivity and then thinned retaining the 8-connectivity, so as not to derange continuity of the valley line data 93C.

Figures 11, 12:
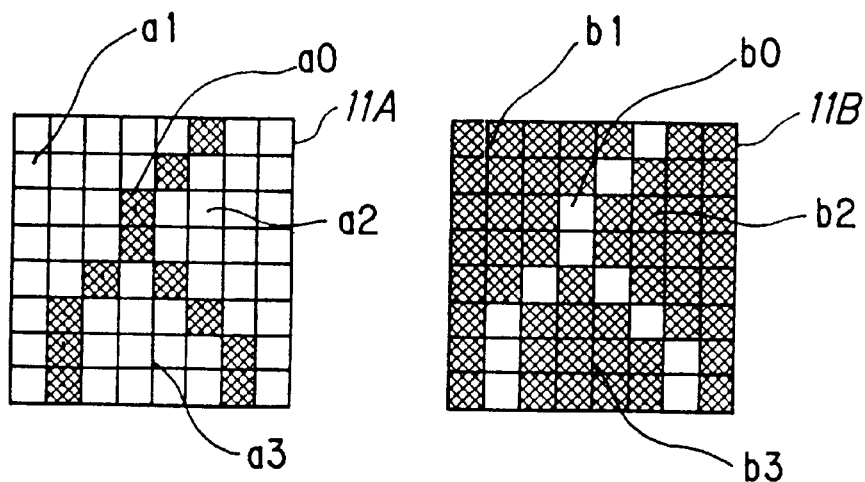
FIG. 11 illustrates a bit map and an inverted bit map of an area of ridge line data.
FIG. 12 illustrates some examples of masking data sets.

The ridge line data of the 8-connectivity, as shown in an example of a bit map 11A, as illustrated in FIG. 11, are reversed into a bit map 11B of FIG. 11, an area b1 of the bit map 11B corresponding to an area a1 of the bit map 11A. Area a1 of the bit map 11A is separated from an area a2 or an area a3. When area b1 of the bit map 11A becomes connected with areas b2 and b3 of 11B that correspond to the areas a2 and a3 of 11A, the bit map 11B is treated as data of the 8-connectivity. This is the reason the reversed data are first thinned while retaining the 4-connectivity in the embodiment before thinning by retaining the 8-connectivity for obtaining the valley line data 93C.

In the embodiment of FIG. 10, the valley line data 93C are obtained from ridge line data 92C. But in an alternative embodiment, the ridge line data may be obtained from valley line data extracted directly from the binary image data, or both ridge line and valley line data may be extracted directly in parallel from the binary image data, when parallel processing can be applied for high-speed processing.

Further, in an alternate embodiment for extracting the ridge line data and the valley-line data, there can also be applied a technology called Voronoi-Line Graph, which is described, for example, in a paper entitled "Extraction of Contour Lines Using Neighboring Relationships Based on the Voronoi-Line Graph" by Mizutani, et al., D-II of the IEICE, Vol. J74-D-II, No. 11, pp. 1499–1506, (November 1991).

In the present embodiment of FIG. 10, the ridge line data 92D (where the ridge line data 92C, is the same data as the ridge line data 92D) and the valley line data 93C, after the thinning processes are completed, are delivered to the ridge minutia extracting device 94 and the valley minutia extracting device 95 respectively. At the ridge minutia extracting device 94 and the valley minutia extracting device 95, masking data sets are prepared, of which some 3×3 bit examples are illustrated in FIG. 12. Thinned line bit maps of the ridge line data 92C and the valley line data 93C are scanned and compared with each of the masking data sets of 3×3 bits. When any 3×3 bits of the thinned line bit maps coincides with any of the masking data sets, the center point of the 3×3 bits is defined as a minutia. Minutiae corresponding to each of the masking data sets of 12A of FIG. 12 are end points and those of 12B are bifurcations.

Some details concerning minutia extraction from thinned line bit maps are described also in the Japanese patent application laid open as Provisional Publication No. 108806/'93 previously referred to.

Thus, the ridge minutia extracting device 94 and the valley minutia extracting device 95 extract ridge ends, ridge bifurcations, valley ends and valley bifurcations from the ridge line data 92C and the valley line data 93C, and output a minutia list of registered minutia information as their coordinates, kind, and the like.

Figure 13:
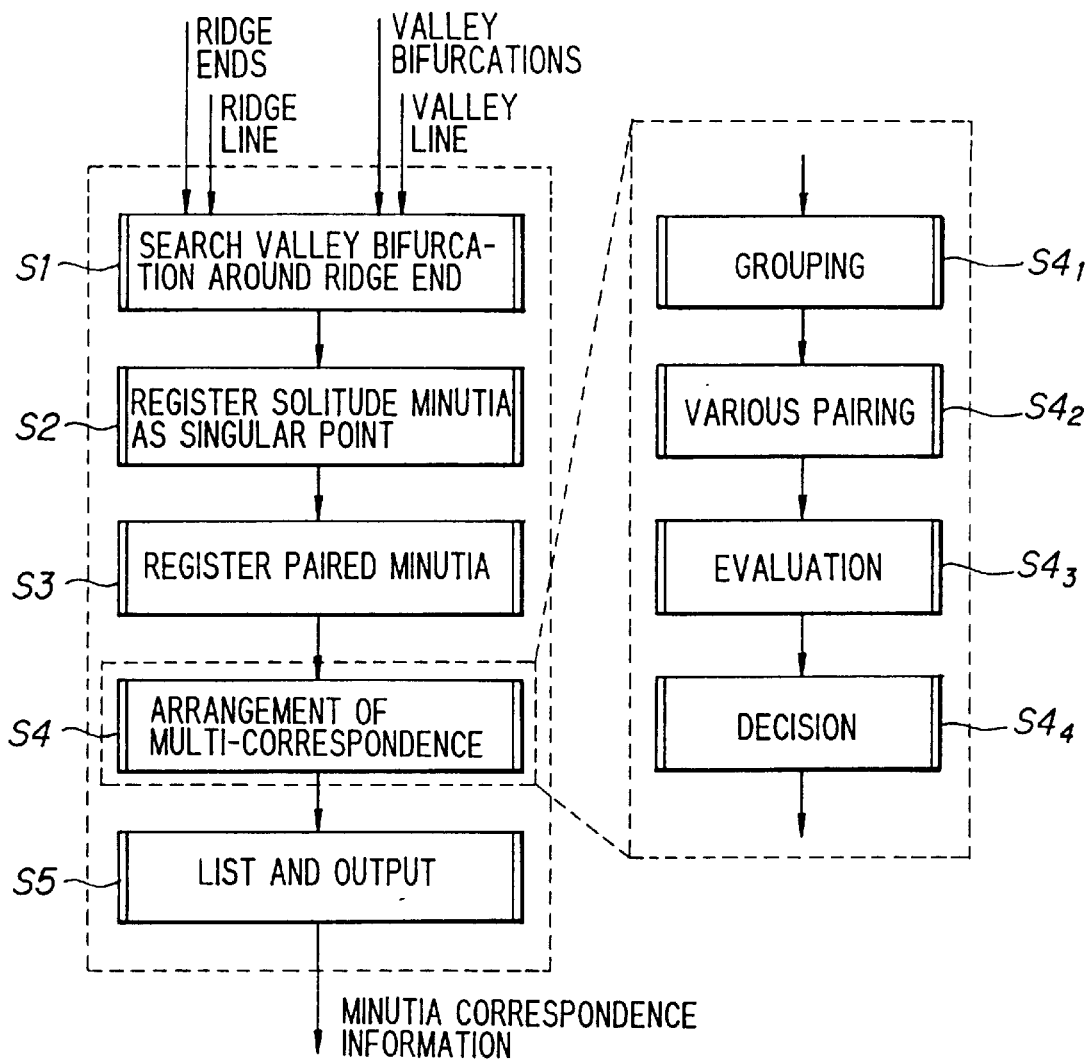
FIG. 13 is a flowchart illustrating processes for extracting dual correspondence between ridge ends and valley bifurcations.

Now, the processing in the minutia correspondence extracting device 96 will be described with reference to a flowchart of FIG. 13. FIG. 13 illustrates processes for extracting dual correspondence between ridge ends and valley bifurcations.

First, at step S1, a valley bifurcation is searched based on the conditions, that follow. The search is conducted for each of the ridge ends registered in the minutia list that are delivered from the ridge minutia extracting device 94 and the valley minutia extracting device 95.

A first of the search conditions is that the distance of the valley bifurcation to be searched, from the ridge end of concern, is smaller than a predetermined value. A second search condition is that the line segment between the ridge end and the valley bifurcation does not cross with any other valley line.

Here, the distance between two minutiae may be measured with any unit. Euclidean distance, "city block" distance or "chessboard" distance can be used, for example, according to definitions described in a document entitled, "Image Analysis Handbook," by Takagi, et al., published by Tokyo University Press, (1991). In the following paragraphs, the embodiment is described with the distance measured using the chessboard distance.

Figure 14:
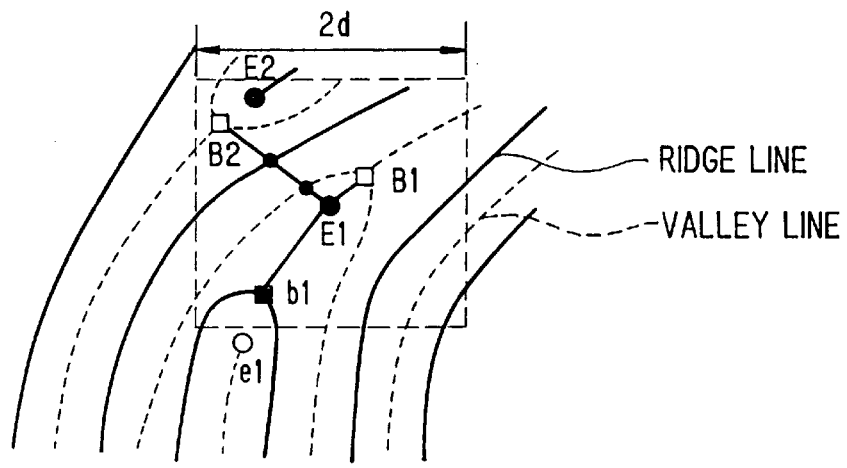
FIG. 14 shows an area of a skin pattern in a chessboard distance d from a ridge end E1 expressed as a square area with an extent of 2 d×2 d.

FIG. 14 shows an example of an area with a chessboard distance d from a ridge end E1 that is expressed as a square area with an extent of 2 d×2 d wherein are comprised valley bifurcations B1 and B2. Therefore, for the ridge end E1, the valley bifurcations B1 and B2 are first picked out from the minutia list. Then, cross points on two line segments E1 to B1 and E1 to B2 are counted and the valley bifurcation B1 is registered as a candidate of the corresponding minutia of the ridge end E1 because the line segment E1 to B1 has no cross point. In the example of FIG. 14, the valley bifurcation B2 is left unregistered because there are two cross points on the line segment E1 to B2.

Thus, in grouping step S1, the corresponding valley bifurcation, if there is any, of each ridge end is picked out and registered as a candidate in the column of each ridge end of concern. And, at the same time, in the column of the corresponding valley bifurcation, the ridge end of concern is also registered as a candidate, for the convenience of the following processes.

FIG. 15 is a schematic chart illustrating an example of the minutia list with reference information of dual correspondence thus registered. In FIG. 15, there are illustrated a ridge end list E1 to En and a corresponding valley bifurcation list B1 to Bn. In FIG. 15 minutiae E1, E8, B1 and B4 are solitude minutiae having no corresponding minutia, a pair of minutiae E2 and B2 are minutiae having one to one correspondence, and others are minutiae having one to multi or multi to multi correspondence where the unique correspondence was unable to be extracted.

Then at various paring at step S2, minutiae having no corresponding minutia, such as E1, E8, B1 and B4 of FIG. 15, are registered as singular points. At step S3, minutiae having one to one correspondence such as the pair of minutiae E2 and B2 are also registered. In the registration of the state of correspondence at steps S2 and S3, information concerning the corresponding minutia and the relation to the lines is also registered together, for the convenience of the following processes.

Figure 16:
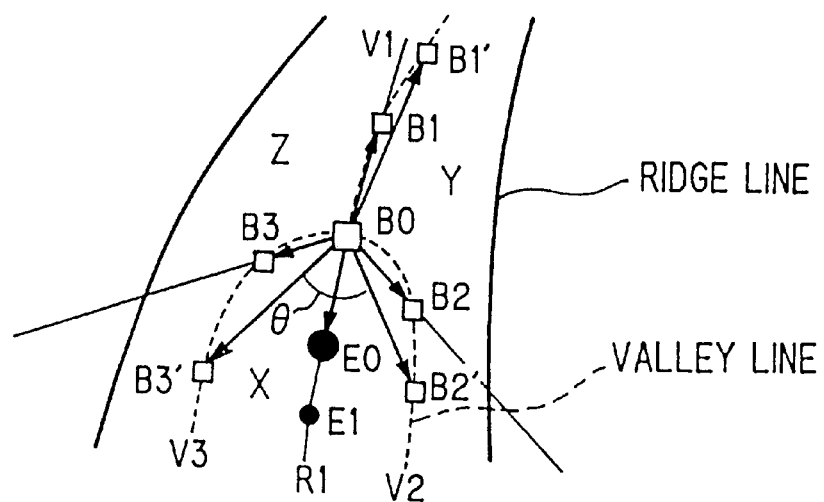
FIG. 16 illustrates an example of a skin pattern where a ridge end E0 and a valley bifurcation B0 are corresponding to each other.

Referring to FIG. 16, here in this example, the information concerning the corresponding minutia and the relation to the lines is when the corresponding minutia exists having three areas (X, Y, X) divided by three lines ($V_1$, $V_2$, $V_3$), starting from the bifurcation of concern, i.e., when the concerning minutia is a bifurcation. For example, when the concerning minutia is an end point, it is desirable to know which of the three lines starting from the corresponding bifurcation exists on the opposite side of the concerning end point.

By way of an example illustrated in FIG. 16, a ridge end E0 and a valley bifurcation B0 are corresponding to each other. The ridge end E0 is a part of a ridge line R1 including an intermediate point E1 and exists in an area X. The area X is divided from other areas is divided by two valley lines V2 and V3 starting from the valley bifurcation B0, and area X is situated on the opposite side of the other valley line V1, where valley line V1 divides the other two areas Y and Z.

This information concerning the corresponding minutia and the relation to the lines can be obtained as follows, for example.

Three intermediate points B1, B2 and B3 are set on the three valley lines $V_1$, $V_2$, $V_3$, respectively, starting from the valley bifurcation B0, each being 5 to 10 pixels away, for example, from the valley bifurcation B0. By calculating and arranging angle values of vectors B0E0, B0B1, B0B2 and B0B3 in order, then the area including the ridge end E0, or the valley line opposite to the ridge end E0 can be specified.

In another example for obtaining the information of FIG. 16, three line segments (not shown) B2 to B3, B3 to B1 and B1 to B3 are considered. Analyzing the three intermediate points B1 to B3 pixel by pixel from the valley bifurcation B0, the line segment which passes on the ridge end E0 gives the necessary information.

Now, the processes at step S4 for extracting a unique correspondence from one to multi or multi to multi correspondence are described by returning to FIG. 13.

At step $S4_1$, every minutia having one to multi or multi to multi correspondence are grouped into one of a plurality of groups. Each of the minutia has a different number, in such a way as any minutia of each group has correspondence with at least one minutia in its group and has no correspondence with any minutia of any other group.

At step $S4_2$, minutiae in each group are paired in such a way so that the number of minutiae unpaired, which are candidates of singular points, becomes minimum, for suppressing pseudo-singular points generated by noises.

At evaluation step $S4_3$, when there are plural ways of pairing which give the same minimum number of singular point candidates, a value of an evaluation function is calculated for each of the plural ways. Here, the evaluation function may be defined with variables such as angles composed by the concerning end points, the bifurcations, or intermediate points on the three lines of the bifurcations, or distances between the concerning end points and the bifurcations. Here in the embodiment, a first evaluation value is calculated from angles composed of each bifurcation and the intermediate points on its lines. For a second evaluation value which is applied when a unique correspondence can not be determined by the first evaluation value, a sum of the distances between minutiae of each corresponding pair is considered.

The first evaluation value EV1, according to angles, is obtained as follows.

Referring to FIG. 16, an angle θ of the bifurcation B0 opposing to corresponding end point E0 is defined with the bifurcation B0 and two intermediate points B2' and B3' on two lines surrounding the end point E0. Here the intermediate points B2' and B3' are better to be more pixels (e.g., 10 to 20) away from the bifurcation B0, than the intermediate points B2 and B3 considered at step S2 or S3 for specifying the area including the end point E0. This increased distance is for obtaining a significant difference of the evaluation value.

Thus, defining each i-th angle $\theta_i$ for each i-th bifurcation, the first evaluation value EV1 is calculated according to following equation.

$$EV1 = \sum_i \cos\theta_i$$

Among the plural ways of pairing which give the same minimum number of singular point candidates, a way which gives the maximum value of EV1 is considered as the way of pairing which brings the most appropriate combination of unique correspondence.

There may occur a rare case where plural ways of pairing give the same evaluation value EV1, since it is calculated from the digital image data. In this case, the second evaluation value EV2 is calculated according to following equation.

$$EV2 = \sum_i d_i$$

where $d_i$ is a distance between minutiae of each i-th pair of corresponding minutiae.

Among the plural ways of pairing that give the same first evaluation value EV1, a way which gives the minimum value of the second evaluation value EV2 is considered as the way of pairing which brings the most appropriate combination of unique correspondence, in this case.

Thus, the most appropriate combination of unique correspondence is decided and singular points are finally selected from their candidates at decision step $S4_4$.

In the following paragraphs, a concrete example of processes from step $S4_1$ to step $S4_4$ is described referring to the example of FIG. 15.

Minutiae having one to multi or multi to multi correspondence in the minutia list of FIG. 15 are grouped in three groups, {E3, E4, B3}, {E5, E6, B5, B6} and {E7, E9, B7, B8, B9} at step $S4_1$.

At step $S4_2$, two ways of pairing, for giving minimum number of unpaired minutiae, can be considered for the group {E3, E4, B3}. A first way is to pair (E3, B3) leaving E4 as a candidate for a singular point. A second way is to pair (E4, B3) leaving E3. As for the group {E5, E6, B5, B6}, only the way of pairing (E5, B6) and (E6, B5) gives no unpaired minutia. Similarly for the group {E7, E9, B7, B8, B9}, three ways of pairing can be considered, that is pairing (E7, B7) and (E9, B8) leaving B9, pairing (E7, B7) and (E9, B9) leaving B8, and pairing (E7, B8) and (E9, B9) leaving B7.

The group {E5, E6, B5, B6}, having only one appropriate way of pairing, passes the step $S4_3$ and each of the pairs is registered at step $S4_4$ as each pair of corresponding minutiae.

As for the groups {E3, E4, B3} and {E7, E9, B7, B8, B9}, the first evaluation value EV1, and the second evaluation value EV2 if necessary, is calculated for each way of pairing at step $S4_3$ and the most appropriate pairs of minutiae are selected and registered at step $S4_4$.

Heretofore, processes in the minutia correspondence extracting device 96 are described in connection with the example of the minutia list of ridge ends and valley bifurcations. But the same processes are performed here, in the minutia correspondence extracting device 96, also for the minutia list of ridge bifurcations and valley ends.

Thus, minutia correspondence is extracted in the embodiment.

As for the information concerning this minutia correspondence and their relation to lines, the minutia correspondence extracting devices 96 outputs, at step S5, the coordinates of minutiae, kinds of minutiae (end point or bifurcation, ridge point or valley point), lines starting from minutiae, and positional relations of corresponding minutiae to the lines, for example.

Then, referring to the minutia correspondence information thus obtained and the ridge line data and the valley line data, the characteristic line tracing device 97 will trace and extract features of characteristic lines concerning singular points, namely minutiae having no correspondence.

In the following paragraphs, processes in the characteristic line tracing device 97 are described by way of example concerning core type singular points.

Figure 1A:
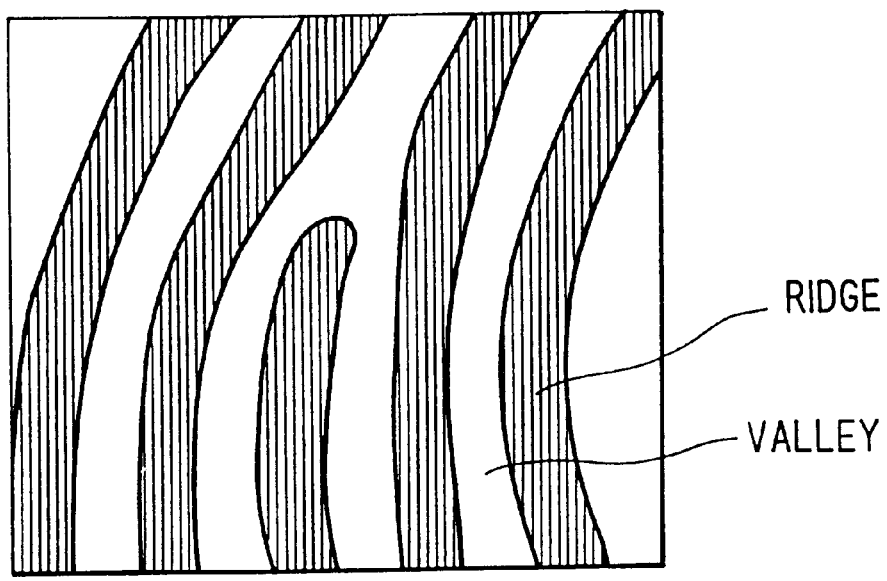
FIG. 1A is a magnified image of an example of a skin pattern having ridges and valleys ranged in parallel.
Figure 1B:
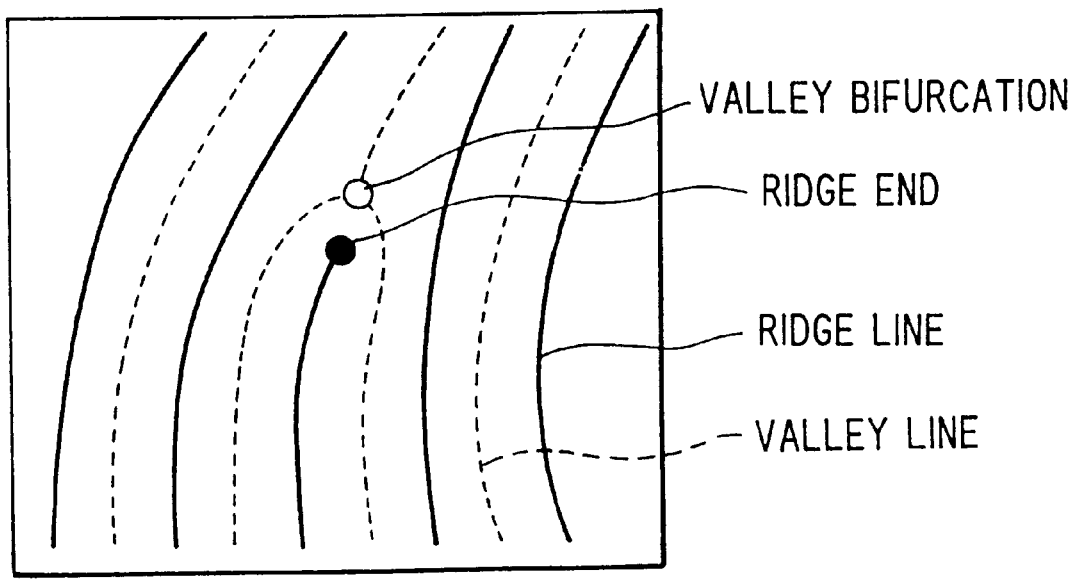
FIG. 1B illustrates a line image of FIG. 1A.
Figure 2A:
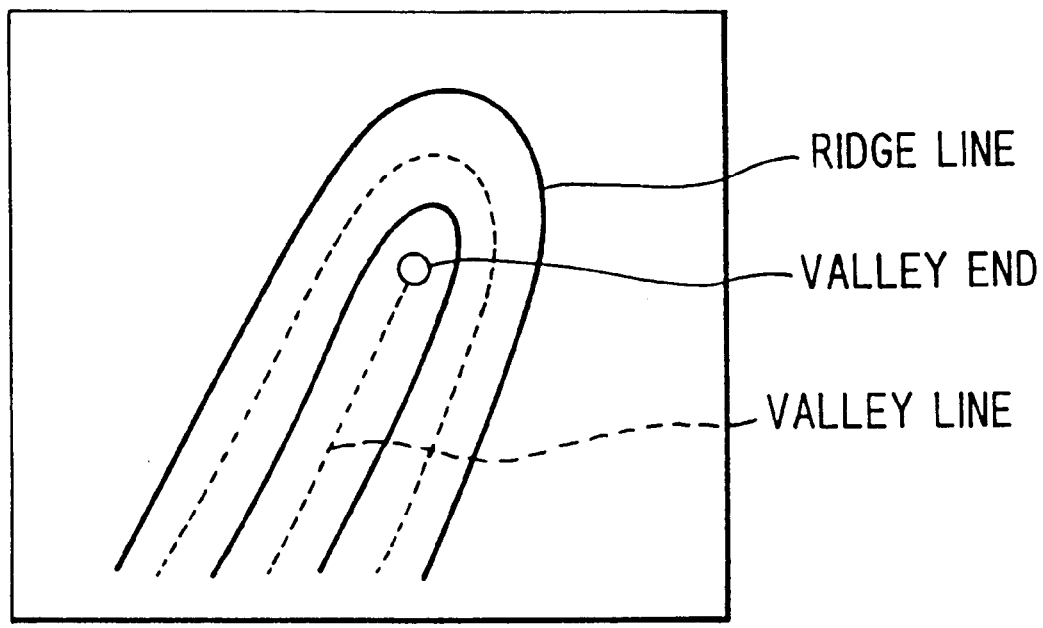
FIG. 2A illustrates a line image of semicircle stripes of ridges and valleys surrounding a valley end.
Figure 2B:
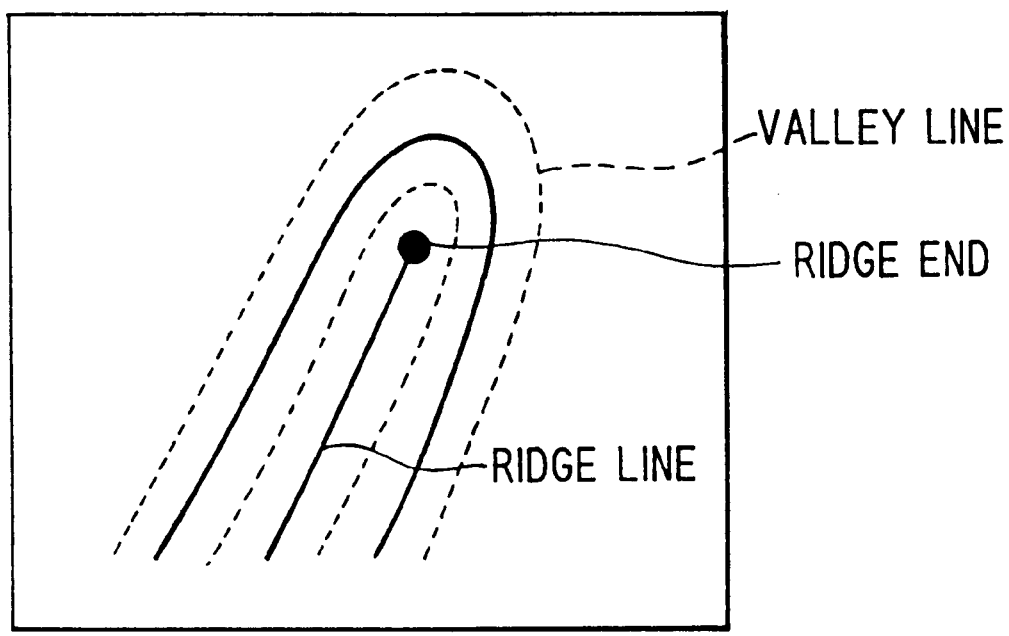
FIG. 2B illustrates a line image of semicircle stripes of ridges and valleys surrounding a ridge end.
Figure 5:
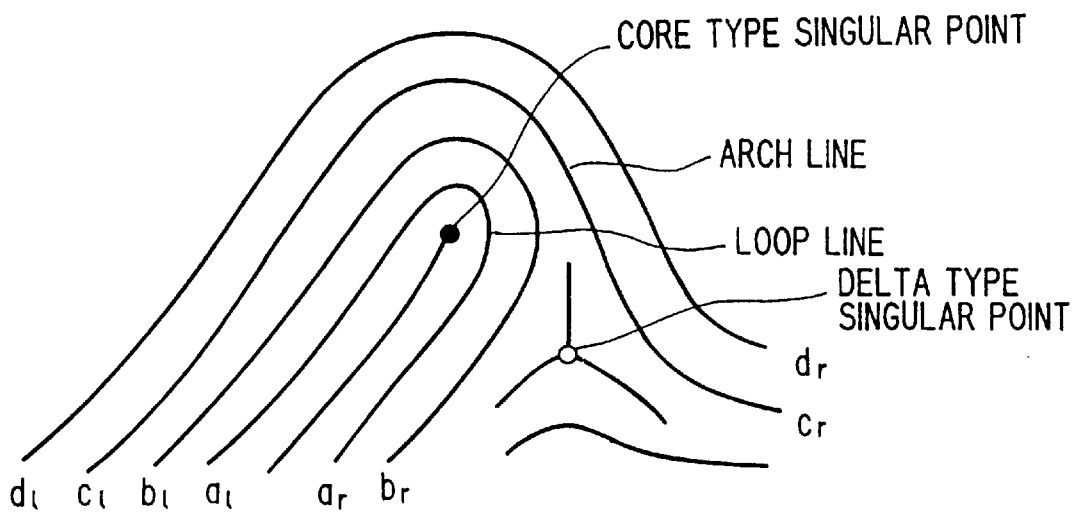
FIG. 5 illustrates an example of a fingerprint of the Left Loop.
Figure 6:
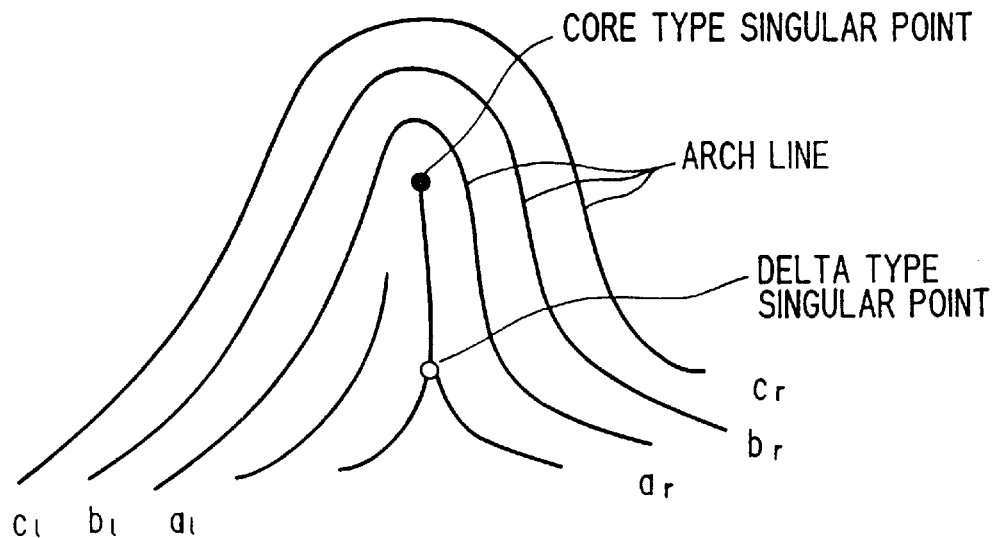
FIG. 6 illustrates an example of a fingerprint of the Tented Arch.

As shown in FIGS. 5 to 7, fingerprints of the Tented Arch type, the Loop type and the Whorl type have a core type singular point or points in their center region in many cases. As previously described, the number of the core type singular points to be found in a fingerprint is 0, 1, 1 and 2 in the Arch, Tented Arch, Loop type and Whorl, respectively. However in actual cases, this number may fluctuate because of noise, and so cannot be relied upon with high accuracy. For this reason, features of characteristic lines surrounding singular points are also used for the pattern classification, besides the number of singular points, in the embodiment.

The ridge line flow around the core type singular point found in the center region of a fingerprint is an important factor for the pattern classification.

In the embodiment, the number of end points without any correspondence, namely the number of core type singular points, is counted up first from the minutia correspondence information concerning ridge ends and valley ends.

Secondly, the tracing of the characteristic line or lines around the singular point is performed in various ways that are described afterwards, according to the number of singular points.

Thirdly, verification is performed whether the characteristic line accords or does not accord to the category of the expected pattern.

Figure 17:
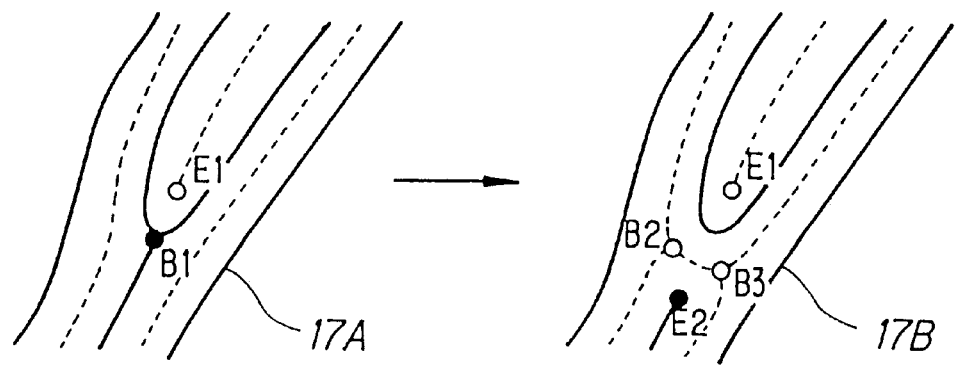
FIG. 17 illustrates examples of a line flow 17A having a pair of corresponding minutiae, a ridge bifurcation B1 and a valley end E1, and its deformation 17B.

Here, in the first process of counting the number of core type singular points, sometimes a singular point may be found in another region than the center region or the delta region because of noise superimposed on the fingerprint image. For example, a line flow 17A of FIG. 17, having a pair of corresponding minutiae, i.e., a ridge bifurcation B1 and a valley end E1, may be deformed to a line flow 17B of FIG. 17. In the deformed line flow 17B, the valley end E1 and a valley bifurcation B2 may be defined as a core type singular point, and a delta type singular point by pairing a ridge end E2 and a valley bifurcation B3.

In order to suppress these noise influences, a verification process is provided in the function for counting up the number of core type singular points of the characteristic line tracing device 97. In the verification process, an appearance possibility A(x, y) is calculated for each subregion having coordinates (x, y) according to following equation.

$$A(x, y) = \sum_{j=-1}^{1} \sum_{i=-1}^{1} |D(x, y) - D(x+i, y+j)|^2$$

In the above equation D(x, y) is the ridge direction value, (as described in the paper beforehand referred to entitled "Automated Fingerprint Identification by Minutia-Network Feature—Feature Extraction Processes—," by Asai, et al., of a sub-region of coordinates (x, y). By omitting singular points found in sub-regions where the appearance possibility A(x, y) is lower than a predetermined value, reliability of singular point is enhanced in the embodiment.

Now the second process of tracing of a characteristic line or lines is described.

When more than two core type singular points are counted in a fingerprint, then data concerning the fingerprint are rejected, without any tracing, as data unable to be classified. The rejected data, e.g., can be degraded by ink spots or an uneven stamping.

When two core type singular points are counted, characteristic line tracing is performed with the assumption that the concerning pattern is the Whorl. The characteristic line tracing is performed with the assumption that the pattern is the Tented Arch or the Loop type when the number of core type singular points is one.

Figure 18:
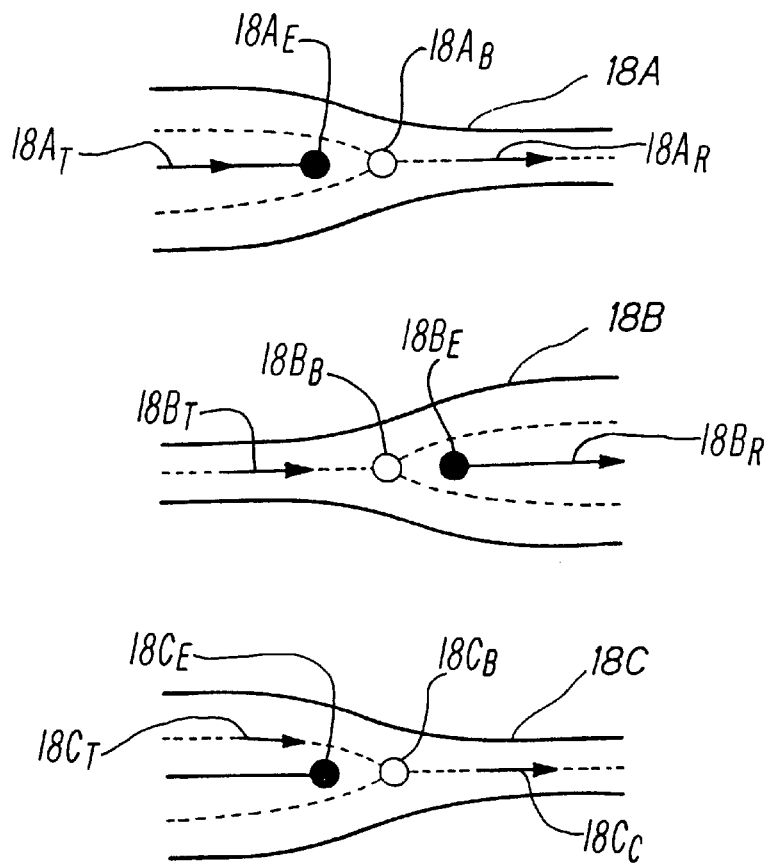
FIG. 18 shows examples of line flows for illustrating rules for tracing.

Both the ridge line and the valley line may end or bifurcate on its way (i.e., along the direction) of tracing. So, there must be some rules for tracing a characteristic line until its real (i.e., true) end. Referring to FIG. 18, the rules for tracing are described next.

When a tracing $18A_T$ ends at an end point $18A_E$, the tracing $18A_R$ is to restart on the opposite line of the line just traced, the opposite line being one of the three lines starting from the corresponding bifurcation $18A_B$ as illustrated in an example of a line flow 18A of FIG. 18. This is a rule.

When a tracing $18B_T$ encounters a bifurcation $18B_B$ as illustrated in another example of a line flow 18B of FIG. 18, the tracing $18B_r$ is to restart on the line starting from the corresponding end point $18B_E$. This is another rule.

When a tracing $18C_T$ arrives at a joining bifurcation $18C_B$ with another line as illustrated in another example of a line flow 18C, the tracing $18C_C$ is to be continued on the third line, that is, the third line is, the opposite line, to the line that comprises the corresponding ending point $18C_E$, of the three lines starting from the bifurcation $18C_B$. This is still another rule.

Yet another rule is that a tracing is to be continued until the tracing arrives at a singular point, goes out of region of the fingerprint image data, or the tracing is performed for more than a predetermined length.

Here, it is to be noted that these rules can be followed easily since information concerning the corresponding minutia, and also the relation to the lines starting from the concerning bifurcation, is registered by the minutia correspondence extracting device 96, as beforehand described.

As for information concerning the region of the fingerprint image data, it can be obtained from data density, for example, of each subregion, dividing the image data into sub-regions, as described in the paper beforehand referred to entitled "Automated Fingerprint Identification by Minutia-Network Feature—Feature Extraction Processes—," by Asai, et al.

Here also, a verification process is desired since characteristic lines can not always be traced correctly because of noise.

In the following paragraphs, the tracing and verification process is described by way of example of tracing characteristic lines of a fingerprint having two core type singular points.

A core line denotes a line starting from a core type singular point. The core line can start from either a ridge end or a valley end.

Figure 7A:
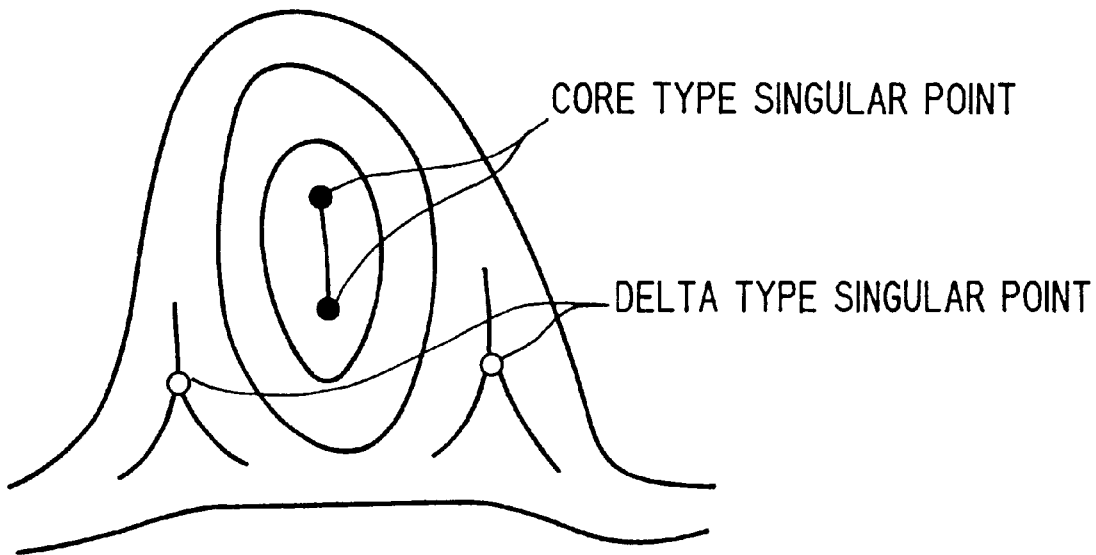
FIG. 7A illustrates an example of a fingerprint of the Whorl.
Figure 7B:
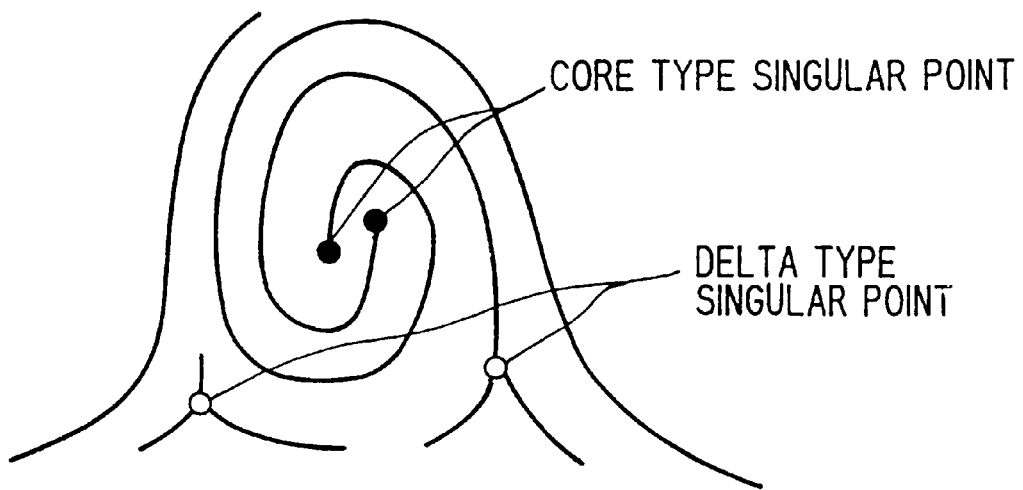
FIG. 7B illustrates another example of a fingerprint of the Whorl.

Fingerprints to be classified into the Whorl type can be further classified into three categories. One of the three categories is Circle as shown in FIG. 7A, where the characteristic line starts from a core type singular point and ends at another core type singular point. Others are a Double Loop and a Spiral, where two core lines form a double spiral as shown in FIG. 7B. A difference between a Double Loop and a Spiral is that the Double Loop is composed of two core lines starting from two ridge ends, or two valley ends, while the Spiral is composed of a core line starting from a ridge end and another core line starting from a valley end.

Each of these three categories, coinciding with the categories used, e.g., in the Japanese criminal laboratory, has its own feature concerning its characteristic lines, enabling the verification of the characteristic line tracing. Although the difference as to whether two core lines start from end points of different kinds or the same kind is useful for discriminating the difference between the Double Loop and the Spiral, it is invalid for verification of the Whorl type.

Therefore, the following three items of the features of characteristic lines are considered for the verification in the embodiment.

The first item is the state of the end point of each core line.

The second item is the whirling directions of the two core lines.

The third item is the directions of tangent vectors of the two core lines at their starting point.

As for the first item, a pattern is determined as the Circle of the Whorl type only when a first core line starting from a first core type singular point, ends at a second core type singular point and a second core line starting from the second core type singular point, which is to be the same with the first core line, ends also at the first core type singular point. If the second core line does not arrive at the first core type singular point when it is traced from the second core type singular point, even though the first core line traced from the first core type singular point arrives at the second core type singular point, then image data of the pattern is treated as unable to be classified.

The second item of verification is applied for patterns having two core type singular points and that have not been determined to be a Circle nor as "unable to be classified" by the first item. The second item of verification is performed as follows.

Figure 19:
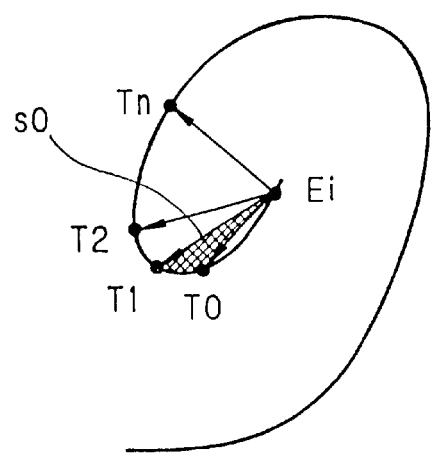
FIG. 19 illustrates a pattern of the Whorl, on which intermediate points T0, T1, T2 . . . , $T_j$, . . . $T_n$ are set.

Referring to FIG. 19, illustrating an example of a pattern of the Whorl, intermediate points T0, T1, T2, . . . , $T_j$, . . . , $T_n$ (j, n being positive integers) are set on every three pixels, for example, of a core line starting from a core type singular point $E_i$ (i being 1 or 2). $E_1 T_j$ is a vector from the core type singular point to an intermediate point $T_j$, and $S_i$ is a sum of each exterior product $S_{ij}$ of vectors $E_1 T_{j-1}$ and $E_1 T_j$ that is calculated as follows.

$$S_i = \sum_{j=1}^{n} S_{ij} = \sum_{j=1}^{n} E_i T_{j-1} \times E_i T_j$$

Here, the absolute value of $S_{ij}$ represents area of triangle $E_1 T_{j-1} T_j$ and the positive or negative sign of $S_{ij}$ represents the direction of a line segment from $T_{j-1}$ to $T_j$. Therefore, the absolute value of the sum $S_i$ represents the size of the whirl and the positive or negative sign of the sum $S_i$ represents the whirling direction of the pattern.

Two spirals formed by two core lines should have the same direction in the Double Loop or the Spiral. Therefore, a pattern of the two features, that is, the two sums $S_1$ and $S_2$, that do not have the relation $S_1 \cdot S_2 > 0$ is determined as "unable to be classified."

The third item of verification is applied for patterns nominated as the Whorl type by the second item. That is, the second item has not determined the patterns to be "unable to be classified." The third item is described next.

Figure 8:
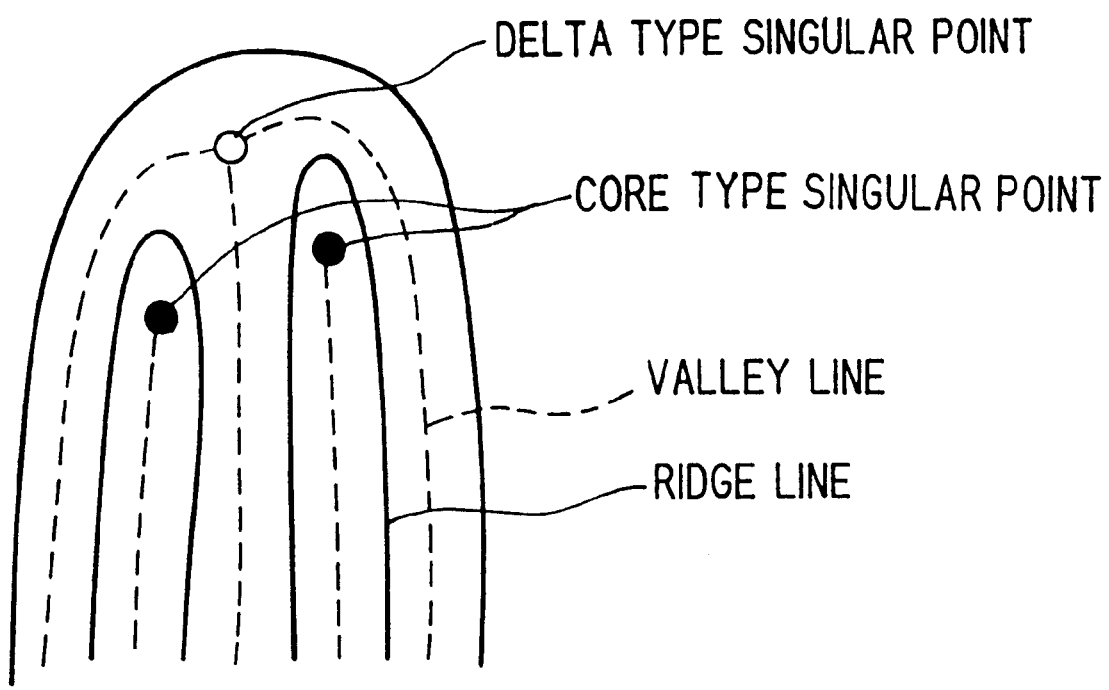
FIG. 8 shows a Loop type fingerprint having two core type singular points.
Figure 20:
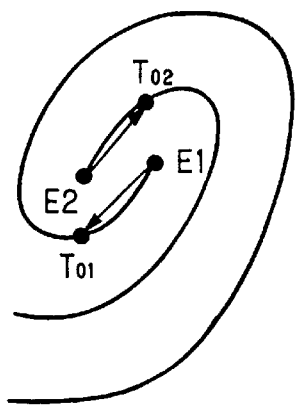
FIG. 20 shows two tangent vectors at the starting points of the two core lines of a pattern of the Whorl having almost opposite directions with each other.

Generally, two tangent vectors at the starting points of the two core lines of a pattern of the Whorl have almost opposite directions with each other as shown in FIG. 20. This opposite direction feature can be used to distinguish the Whorl. On the other hand, in the Loop type example of FIG. 8, both of the two tangent vectors (not shown) starting from each of the core type singular points (shown) have essentially the same direction.

Therefore, setting the intermediate points T01 and T02 on each of two core lines near each starting point as illustrated in FIG. 20, the following evaluation value $\epsilon$ is calculated from tangent vectors E1T01 and E2T02.

$$\epsilon = E1T01 \times E2T02 / (|E1T01||E2T02|)$$

When the evaluation value $\epsilon$ is not in a range −0.5 to 0, for example, the concerning pattern is determined as "unable to be classified."

In patterns having two core type singular points that are determined to be unable to be classified by the first item, the second item or the third item, there are some cases where a delta type singular point is found near the core line. For example, when there is a line flow such as 17B of FIG. 17 in a pattern of the Loop type, because of noise for example, two core type singular points, one being E1, are found in the pattern, and where E2 and B2 are regarded as corresponding minutiae. In this case, there is left a delta type singular point B3 near the core type singular point E1.

Therefore, the patterns determined as unable to be classified by the three items, and that have a delta type singular point near one of their two core type singular points, may be treated as patterns having only one core type singular point, disregarding the delta type singular point and the core type singular point near the delta type singular point.

These patterns can be left determined as unable to be classified at this stage in the process of the characteristic line tracing device 97.

Now, processes of the characteristic line tracing for patterns having only one core type singular point is described.

Figure 21:
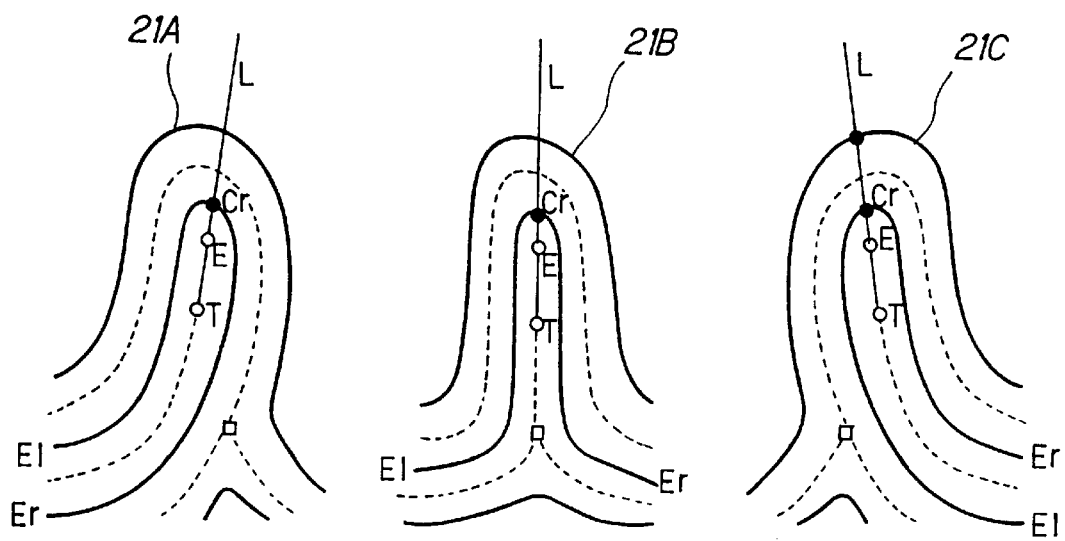
FIG. 21 shows examples of patterns of the Left Loop 21A, the Tented Arch 21B and the Right Loop 21C.
Figure 23:
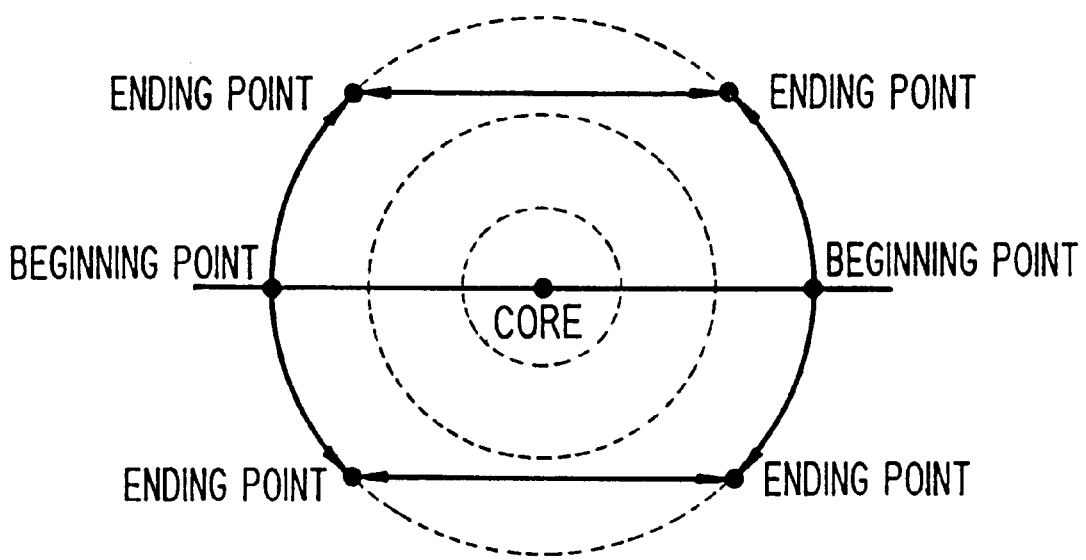
FIG. 23 is a schematic diagram illustrating the tracing of a prior art of ridge lines around a core of a fingerprint having features to be classified as a Whorl.

Referring to FIG. 21, the characteristic line tracing is performed here assuming that the pattern to be identified is to be one of either the Left Loop pattern 21A, the Tented Arch, pattern 21B or the Right Loop pattern 21C of FIG. 21.

And here, the characteristic line tracing is performed also on ridge lines surrounding the core type singular point, in addition to the core line. The ridge lines surrounding the core type singular point are called hereafter as surround lines, i.e., a first surround line, a second surround line, and the like indexed from the inner most ridge lines.

Returning to FIG. 21, on a core line, which may be a ridge line or a valley line, an intermediate point T is set (e.g.,) 20 to 30 pixels away from a core type singular point E. On a straight line L starting from the intermediate point T and passing through the core type singular point E, there is set a cross point Cr with a first surround line. From the cross point Cr, the first surround line is traced in both directions, i.e., right and left, until reaching end points $E_1$ and $E_r$.

In a first process, the direction of the core line is verified. Since surround lines are generally tented upwards in the Tented Arch and the Loop type, a pattern having only one core type singular point and when the direction of its vector ET is upward, the pattern is determined as abnormal and unable to be classified.

The relation of positions of the end points $E_1$ and $E_r$ to the cross point Cr is verified next. When the end points $E_1$ and $E_r$ are both on the left side of the center point Cr, the concerning pattern is nominated as the Left Loop. When end points $E_1$ and $E_r$ are both on the right side of the center point Cr, the concerning pattern is nominated as the Right Loop. If end points $E_1$ and $E_r$ are not both on either the left or the right of the center point $C_r$, then the concerning pattern is nominated as the Tented Arch.

However, there may occur an indeterminacy in the characteristic line tracing above described because of noise superimposed on the image data, for example.

By way of example of a pattern 22A, of FIG. 22 illustrating patterns 22A and 22B, each of the patterns composed of a core line and surround lines, then suppose a case where a ridge line segment P to Q1 or P to Q2 is imperfect for both 22A and 22B of FIG. 22.

According to the rules for tracing beforehand described, it is undetermined whether the trace may be continued through the ridge end Q1 or Q2. When the trace is continued through the ridge end Q1, the pattern 21A is regarded as the Left Loop; however, it is regarded as the Tented Arch when the trace is continued through the ridge end Q2. For this reason, a second surround line is traced in the same way, in addition to the first surround line, and when results for the first and the second surround line are inconsistent with each other, then even patterns once nominated to a category are also determined as unable to be classified.

Now, processes in the pattern classification device 98 is described.

By the characteristic line tracing device 97, patterns are classified into one of the Whorl, the Left Loop, the Right Loop, the Tented Arch and the Plain Arch, or are determined as unable to be classified. So, the results of the characteristic line tracing device 97 themselves can be available as the classification result of the system. However in the embodiment, the pattern classification device 98 is provided for further improvement of classification precision and for convenience of rejection level control and second possibility assignment, by making use of a probability table.

In the pattern classification device 98 of the embodiment, every pattern processed in the characteristic line tracing device 97 is pre-classified into one of the detailed categories. The detailed categories are prepared according to the number of core type singular points, number of delta type singular points and the classification results of the characteristic line tracing device 97.

The number of core type singular points is classified into four categories, 0, 1, 2 and more than 2. The number of delta type singular points is also classified into the same. The classification result of the characteristic line tracing device 97 has six categories, the Plain Arch, the Tented Arch, the Left Loop, the Right Loop, the Whorl and a category unable to be classified. Therefore, there can be prepared a total of 96=4×4×6 detailed categories expressed as $c_i$ (i=1, ..., 96).

For each detailed category $c_i$, five probabilities $P_{ji}$ are prepared, j being one of symbols A, T, L, R or W, each representing one of the five categories $C_j$, the Plain Arch $C_A$, the Tented Arch $C_T$, the Left Loop $C_L$, the Right Loop $C_R$ and the Whorl $C_W$, respectively. The probabilities $P_{ji}$ can be obtained from a sufficient number of learning data as follows.

When a number of learning data already classified, by manual classification for example, into one of the five categories $C_j$, are then pre-classified by a system of the embodiment into detailed categories $c_i$, the probability $P_{ji}$ is calculated according to following equation.

$$P_{ji} = N_{ji} \Big/ \sum_k N_{ki}$$

In this equation $N_{ki}$ represents the number of learning data already classified into a category $C_k$ of the five categories and pre-classified into a detailed category $c_i$.

When the number of each of the patterns of the Plain Arch, the Tented Arch, the Left Loop, the Right Loop and the Whorl, that are pre-classified into a detailed category $c_i$, is 3, 5, 89, 1, and 2 respectively, then the probabilities $P_{Ai}$, $P_{Ti}$, $P_{Li}$, $P_{Ri}$ and $P_{Wi}$ are 3%, 5%, 89%, 1% and 2%, respectively.

About 10,000 cases of leaning data will provide a probability table sufficiently precise.

As for the pattern classification, there are several cases, such as a case where every pattern is expected to be classified without rejection, or a case where unreliable patterns are expected to be classified with a second possibility, for example.

In the following paragraphs, some examples of usage of the probability table are described according to the cases.

When every pattern is expected to be classified into one of the five categories $C_j$, the pattern classification device 98 outputs the one "most probable" category of the detailed category $c_i$ where the concerning pattern is pre-classified.

For the above example of $c_i$, the Left Loop $C_L$ which gives $P_{Li}$=89% is output.

When a first possible category having a preciseness more than a threshold value th is expected, the most probable category is output only on the condition that its probability is not less than the threshold value th. For this example, the Left Loop $C_L$ is output when th≦89% and otherwise none is output.

When there is expected a first possible category, if it has a sufficient preciseness, and a first and a second possible categories, if the first possible category has not a sufficient possibility and can be reinforced by the second possibility, the pattern classification device 98 behaves as follows:

$$C = \begin{cases} C_k & \text{in case } P_{ki} \geq th \text{ and } P_{ki} = \max(P_{ji}) \\ C_k \text{ and } C_l & \text{in case } P_{ki} < th, P_{ki} + P_{li} \geq th \text{ and} \\ & P_{li} = \max(P_{ji}, j \neq k) \\ \text{none} & \text{in case } P_{ki} + P_{li} < th \end{cases}$$

For this example, C is the Left Loop $C_L$ when th≦89%, C is Left Loop $C_L$ or the Plain Arch $C_A$ when 89%<th≦94% and none is output when th>94%.

Thus, in the embodiment of the present invention, pattern classification is performed with stable precision, its rejection level is easily controlled and a second classification possibility is assigned without difficulty.

Heretofore, the embodiment is described mainly in connection with fingerprint classification. However, it can be understood that embodiment can be applied in other skin pattern classification such as palm pattern classification as well as in fingerprint classification, in the scope of the present invention.

What is claimed is:

1. A skin pattern tracing system comprising:

image data input means wherein image data of a skin pattern are input, said skin pattern comprising a plurality of ridges and valleys;

ridge line extracting means for extracting ridge line data corresponding to said ridges of said skin pattern from said image data;

valley line extracting means for extracting valley line data corresponding to said valleys of said skin pattern from said image data;

ridge minutia extracting means for extracting ridge minutiae from said ridge line data;

valley minutia extracting means for extracting valley minutiae from said valley line data;

minutia correspondence extracting means for extracting minutia correspondence information by detecting dual correspondence among said ridge minutiae and said valley minutiae, from said ridge line data, said valley line data, said ridge minutiae, and said valley minutiae, said dual correspondence defined to have a distance between minutiae less than a predetermined value and a line segment between said minutiae not crossing any valley or ridge; and means for extracting features of characteristic lines of said skin pattern by finding and tracing said characteristic lines referring to said minutia correspondence information, said ridge line data and said valley line data.

2. A skin pattern classification system comprising a skin pattern tracing system recited in claim 1 and comprising a pattern classification means for classifying said skin pattern according to said features of characteristic lines and said minutia correspondence information.

3. A skin pattern classification system recited in claim 2, wherein said pattern classification means comprises:

means for pre-classifying said skin pattern into one of a plurality of detailed categories, said detailed categories defined according to said features of characteristic lines and said minutia correspondence information;

a probability table to be referred to with each of said detailed categories for obtaining classification probabilities, each of said classification probabilities corresponding to each of a plurality of output categories, said classification probabilities indicating a probability of a skin pattern that is pre-classified into said each of said detailed categories that is to be classified into said each of said output categories; and means for classifying a skin pattern, wherein said skin pattern is pre-classified into each of said detailed categories, and wherein said skin pattern classifying means classifies said skin pattern into one of said output categories referring to said probability table.

4. A fingerprint tracing system comprising:

image data input means wherein image data of a fingerprint are input, said fingerprint comprising a pattern of a plurality of ridges and valleys;

ridge line extracting means for extracting ridge line data corresponding to said ridges of said pattern of said fingerprint from said image data;

valley line extracting means for extracting valley line data corresponding to said valleys of said pattern from said image data;

ridge minutia extracting means for extracting ridge minutiae from said ridge line data;

valley minutia extracting means for extracting valley minutiae from said valley line data;

minutia correspondence extracting means for extracting minutia correspondence information by detecting dual correspondence among said ridge minutiae and said valley minutiae, from said ridge line data, said valley line data, said ridge minutiae, and said valley minutiae, said dual correspondence defined to have a distance between minutiae less than a predetermined value and a line segment between said minutiae not crossing any valley or ridge; and means for extracting features of characteristic lines of said fingerprint by finding and tracing said characteristic lines referring to said minutia correspondence information, said ridge line data and said valley line data.

5. A fingerprint classification system comprising a fingerprint tracing system recited in claim 4 and comprising a pattern classification means for classifying said fingerprint according to said features of characteristic lines and said minutia correspondence information.

6. A fingerprint classification system recited in claim 5, wherein said pattern classification means comprises:

means for pre-classifying said fingerprint into one of a plurality of detailed categories, said detailed categories defined according to said features of characteristic lines and said minutia correspondence information;

a probability table to be referred to with each of said detailed categories for obtaining classification probabilities, each of said classification probabilities corresponding to each of a plurality of output categories, said classification probabilities indicating a probability of a fingerprint that is pre-classified into said each of said detailed categories that is to be classified into said each of said output categories; and means for classifying a fingerprint, wherein said fingerprint is pre-classified into each of said detailed categories wherein said fingerprint classifying means classifies a fingerprint into one of said output categories referring to said probability table.

7. A skin pattern tracing method comprising the steps of:

inputting image data of a skin pattern, said skin pattern comprising a plurality of ridges and valleys;

extracting ridge line data corresponding to said ridges of said skin pattern from said image data;

extracting valley line data corresponding to said valleys of said skin pattern from said image data;

extracting ridge minutia from said ridge line data;

extracting valley minutiae from said valley line data;

extracting minutia correspondence information by detecting dual correspondence among said ridge minutiae and said valley minutiae, from said ridge line data, said valley line data, said ridge minutiae and said valley minutiae, said dual correspondence defined to have a distance between minutiae less than a predetermined value and a line segment between said minutiae not crossing any valley or ridge; and extracting features of characteristic lines of said skin pattern by finding and tracing said characteristic lines referring to said minutia correspondence information, said ridge line data and said valley line data.

8. The method as recited in claim 7 further comprising the step of classifying said skin pattern according to said features of characteristic lines and said minutia correspondence information.

9. A method as recited in claim 8 wherein said step of classifying said skin pattern further comprises the steps of:

pre-classifying said skin pattern into one of a plurality of detailed categories, said detailed categories defined according to said features of characteristic lines and said minutia correspondence information;

obtaining classification probabilities from a probability table for each detailed category, each of said classification probabilities corresponding to each of a plurality of output categories, said classification probabilities indicating a probability of a skin pattern that is pre-classified into said each of said detailed categories that is to be classified into said each of said output categories; and classifying a skin pattern, wherein said skin pattern is pre-classified into each of said detailed categories, by classifying said skin pattern into one of said output categories referring to said probability table.

10. A fingerprint tracing method comprising the steps of:

inputting image data of a fingerprint, said fingerprint comprising a pattern of a plurality of ridges and valleys;

extracting ridge line data corresponding to said ridges of said pattern of said fingerprint from said image data;

extracting valley line data corresponding to said valleys of said pattern from said image data;

extracting ridge minutiae from said ridge line data;

extracting valley minutiae from said valley line data;

extracting minutia correspondence information by detecting dual correspondence among said ridge minutiae and said valley minutiae, from said ridge line data, said valley line data, said ridge minutiae, and said valley minutiae, said dual correspondence defined to have a distance between minutiae less than a predetermined value and a line segment between said minutiae not crossing any valley or ridge; and extracting features of characteristic lines of said fingerprint by finding and tracing said characteristic lines referring to said minutia correspondence information, said ridge line data and said valley line data.

11. A method as recited in claim 10 further comprising the step of classifying said fingerprint according to said features of characteristic lines and said minutia correspondence information.

12. The method as recited in claim 11 wherein said classifying step further comprises the steps of:

pre-classifying said fingerprint into one of a plurality of detailed categories, said detailed categories defined according to said features of characteristic lines and said minutia correspondence information;

obtaining classification probabilities from a probability table for each detailed category, each of said classification probabilities corresponding to each of a plurality of output categories, said classification probabilities indicating a probability of a fingerprint that is pre-classified into said each of said detailed categories that is to be classified into said each of said output categories; and classifying a fingerprint, wherein said fingerprint is pre-classified into each of said detailed categories, wherein said classifying step classifies said fingerprint into one of said output categories referring to said probability table.

\* \* \* \* \*